(12) United States Patent
Omiya et al.

(10) Patent No.: US 10,984,298 B2
(45) Date of Patent: Apr. 20, 2021

(54) ACQUIRING ITEM VALUES FROM PRINTERS BASED ON NOTATION FORM SETTINGS

(71) Applicant: SEIKO EPSON CORPORATION, Tokyo (JP)

(72) Inventors: Hidehisa Omiya, Matsumoto (JP); Yuichi Sugiyama, Matsumoto (JP); Hideaki Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/566,264

(22) Filed: Sep. 10, 2019

(65) Prior Publication Data
US 2020/0082232 A1   Mar. 12, 2020

(30) Foreign Application Priority Data

Sep. 11, 2018   (JP) .............................. JP2018-169899

(51) Int. Cl.
*G06K 15/02*      (2006.01)
*G06F 3/12*       (2006.01)

(52) U.S. Cl.
CPC ....... *G06K 15/1846* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 2012/0185368 A1* | 7/2012 | Schloter | G06Q 40/12 705/30 |
| 2012/0330971 A1* | 12/2012 | Thomas | G06F 16/3334 707/748 |
| 2013/0226554 A1 | 8/2013 | Dillard et al. | |
| 2017/0185986 A1* | 6/2017 | Nishizawa | G06F 40/163 |
| 2017/0223111 A1* | 8/2017 | Yoshizawa | G07G 1/0081 |

FOREIGN PATENT DOCUMENTS

| | | |
|---|---|---|
| EP | 2579194 | 4/2013 |
| JP | 2012027633 | 2/2012 |

OTHER PUBLICATIONS

European Search Report issued in corresponding Application No. EP19196777 dated Jan. 22, 2020.

* cited by examiner

*Primary Examiner* — Miya J Williams
(74) *Attorney, Agent, or Firm* — Workman Nydegger

(57) ABSTRACT

A control server to which a management apparatus and a printer configured to print settlement information and issues a receipt are connectable, includes a processor configured to acquire text data on the settlement information from the printer, acquires an item value of an item contained in the settlement information from the text data, acquires a setting relating to a notation form of the item value in the different notation forms depending on regions from the processor, and acquires the item value in the different notation forms depending on regions from the text data based on the setting.

15 Claims, 12 Drawing Sheets

FIG. 6

ITD

```
1234 XXXXStreet, New York
12-345-678
_____
Check# : C0001
2-Oct-2015  12:00
_____
 1     Beer            10. 00
 1     Toy             60. 00
~~~~~~~~~~~~~~~~~~
 SUBTOTAL              70. 00
 TAX                    6. 13
 TOTAL                 76. 13
```

ACQUIRING ITEM VALUES FROM PRINTERS BASED ON NOTATION FORM SETTINGS

The present application is based on, and claims priority from JP Application Serial Number 2018-169899, filed Sep. 11, 2018, the disclosure of which is hereby incorporated by reference herein in its entirety.

BACKGROUND

1. Technical Field

The present disclosure relates to an information processing apparatus, a control method for an information processing apparatus, and a storage medium storing a program for an information processing apparatus.

2. Related Art

In related art, a technique of converting output data output from an accounting processing unit within a POS terminal in a form interpretable by an external apparatus, transmitting the converted data to the external apparatus, and managing the transmitted data in the external apparatus is known (for example, see JP-A-2012-27633).

Regarding the POS terminal that performs accounting processing disclosed in JP-A-2012-27633, in response to the accounting processing, the POS terminal itself or a printer connected to the POS terminal issues a receipt with settlement information on a settlement in the accounting processing printed thereon. The settlement information printed on the receipt contains item values corresponding to various items and the item values may contain beneficial item values that can be utilized later. In the viewpoint, in related art, an analysis of the settlement information is made in such a manner that item values are acquired from text data in which the settlement information printed on the receipt is described in text.

The item values of the items contained in the settlement information include item values in the different notation forms depending on regions where receipts are issued. Accordingly, in related art, it may be hard to appropriately or precisely acquire item values depending on receipts, and it may be difficult to accurately analyze settlement information.

SUMMARY

An advantage of some aspects of the present disclosure is to appropriately or precisely acquire item values from settlement information printed on a receipt.

An embodiment of the present disclosure is directed to an information processing apparatus to which a control apparatus and a printer configured to print settlement information and issues a receipt are connectable, includes a processor configured to acquire text data on the settlement information from the printer, acquires an item value of an item contained in the settlement information from the text data, acquires a setting relating to a notation form of the item value different depending on a region from the control apparatus, and acquires the item value in the notation form different depending on the region from the text data based on the setting.

In the embodiment, the setting relating to the notation form may be a setting of a symbol of at least one of a currency, a decimal separator, and a grouping separator for notation of the item value indicating an amount of money.

In the embodiment, the symbol of the decimal separator may include a symbol of at least one of a dot, a comma, an apostrophe, and a bullet point.

In the embodiment, the symbol of the grouping separator may include a symbol of at least one of a dot, a comma, an apostrophe, and a space.

In the embodiment, the setting relating to the notation form may be a setting relating to a notation form of the item value indicating a date when the printer issues the receipt.

Another embodiment of the present disclosure is directed to a control method for an information processing apparatus connectable to a printer configured to print settlement information and issues a receipt, includes acquiring text data on the settlement information from the printer and acquiring an item value of an item contained in the settlement information from the text data, when acquiring the item value, acquiring a setting relating to a notation form of the item value different depending on a region, and acquiring the item value in the notation form different depending on the region from the text data based on the setting.

Another embodiment of the present disclosure is directed to a storage medium storing a program for an information processing apparatus executable by a processor of the information processing apparatus communicable with a printer configured to print settlement information and issues a receipt, and the processor acquires text data on the settlement information, acquires an item value of an item contained in the settlement information from the text data, when acquiring the item value, acquires a setting relating to a notation form of the item value different depending on a region, and acquires the item value in the notation form different depending on the region from the text data based on the setting.

BRIEF DESCRIPTION OF THE DRAWINGS

FIG. 6 shows an example of print text data.

DESCRIPTION OF EXEMPLARY EMBODIMENTS

Figure 1:
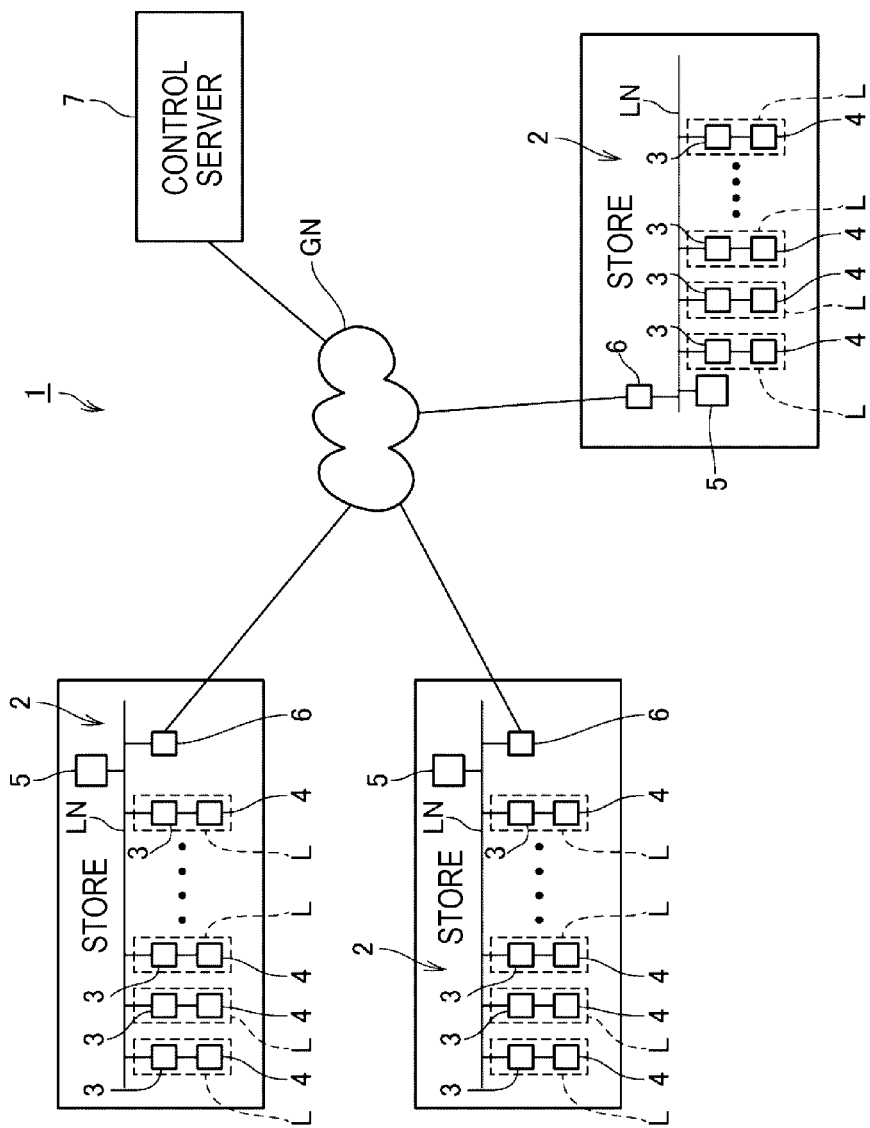
FIG. 1 shows a configuration of an information processing system.

FIG. 1 shows the configuration of an information processing system 1 according to an embodiment.

As shown in FIG. 1, the information processing system 1 includes a plurality of store systems 2. The store systems 2 are used for stores including supermarkets, convenience stores, department stores, and restaurants. The store may be a place where products are provided and customers make payments for provision of the products. In the embodiment, "products" means not only products to be handed to customers as objects but also subjects provided to customers in exchange for compensation including services provided to customers and food and drink provided to customers.

The store system 2 has a function of accounting for products purchased by customers, a function of issuing receipts R for the accounting, etc.

In a store to which the store system 2 is applied, a register counter (checkout counter) L at which customers make payments is provided. FIG. 1 shows the case where a plurality of register counters L are provided in a single store, however, only one register counter L may be provided in a single store. In the register counter L, a printer 3 having a function of printing on a roll of paper as a form of a printing medium is provided. Further, in the register counter L, a POS terminal 4 wirelessly connected to the printer 3 and controlling the printer 3 is provided. The details of the printer 3 and the POS terminal 4 will be described later.

For accounting in the register counter L, a person in charge of the register (an operator who performs accounting processing) reads barcodes attached to products and packages of the products using a barcode reader BR connected to the printer 3 and makes entries corresponding to the accounting in the POS terminal 4. The printer 3 transmits data based on the reading by the barcode reader BR to the POS terminal 4. The POS terminal 4 controls the printer 3 to issue a receipt R based on the data based on the reading by the barcode reader BR received from the printer 3 and the entries corresponding to the accounting by the person in charge of the register. The receipt R issued by the printer 3 is handed to the customer by the person in charge of the register.

The store system 2 includes a local area network LN.

To the local area network LN, the printer 3 and a management apparatus 5 (management computer, control computer) are connected. The management apparatus 5 corresponds to a control apparatus. The details of the management apparatus 5 will be described later.

Further, a communication apparatus 6 is connected to the local area network LN. The communication apparatus 6 is an interface apparatus connecting the local area network LN and a global network GN including the Internet, a telephone network, and other communication networks. The communication apparatus 6 has a function relating to a modem or ONU (Optical Network Unit), a router function, an NAT (Network Address Translation) function, a DHCP (Dynamic Host Configuration Protocol) server function, etc. For communication between an apparatus connected to the local area network LN and an apparatus connected to the global network GN, the communication apparatus 6 transfers data to be transmitted and received between the apparatuses. Note that, in FIG. 1, the communication apparatus 6 is represented by a single block, however, the communication apparatus 6 may have a configuration with a plurality of apparatuses according to the functions.

The printer 3 and the management apparatus 5 can access the global network GN via the communication apparatus 6.

A control server 7 is connected to the global network GN. The control server 7 corresponds to an information processing apparatus. The control server 7 is a server apparatus that can communicate with the printer 3 and the management apparatus 5. That is, the control server 7 executes predetermined arithmetic processing on a request from a client or the like as a trigger. The control server 7 transmits data based on a result of the arithmetic processing to the client as appropriate. Note that, in FIG. 1, the control server 7 is represented by a single block, however, this does not mean that the control server 7 is formed by a single server apparatus. For example, the control server 7 may include a plurality of server apparatuses. That is, the control server 7 may have any configuration as long as the server can execute various kinds of processing, which will be described later.

Figure 2:
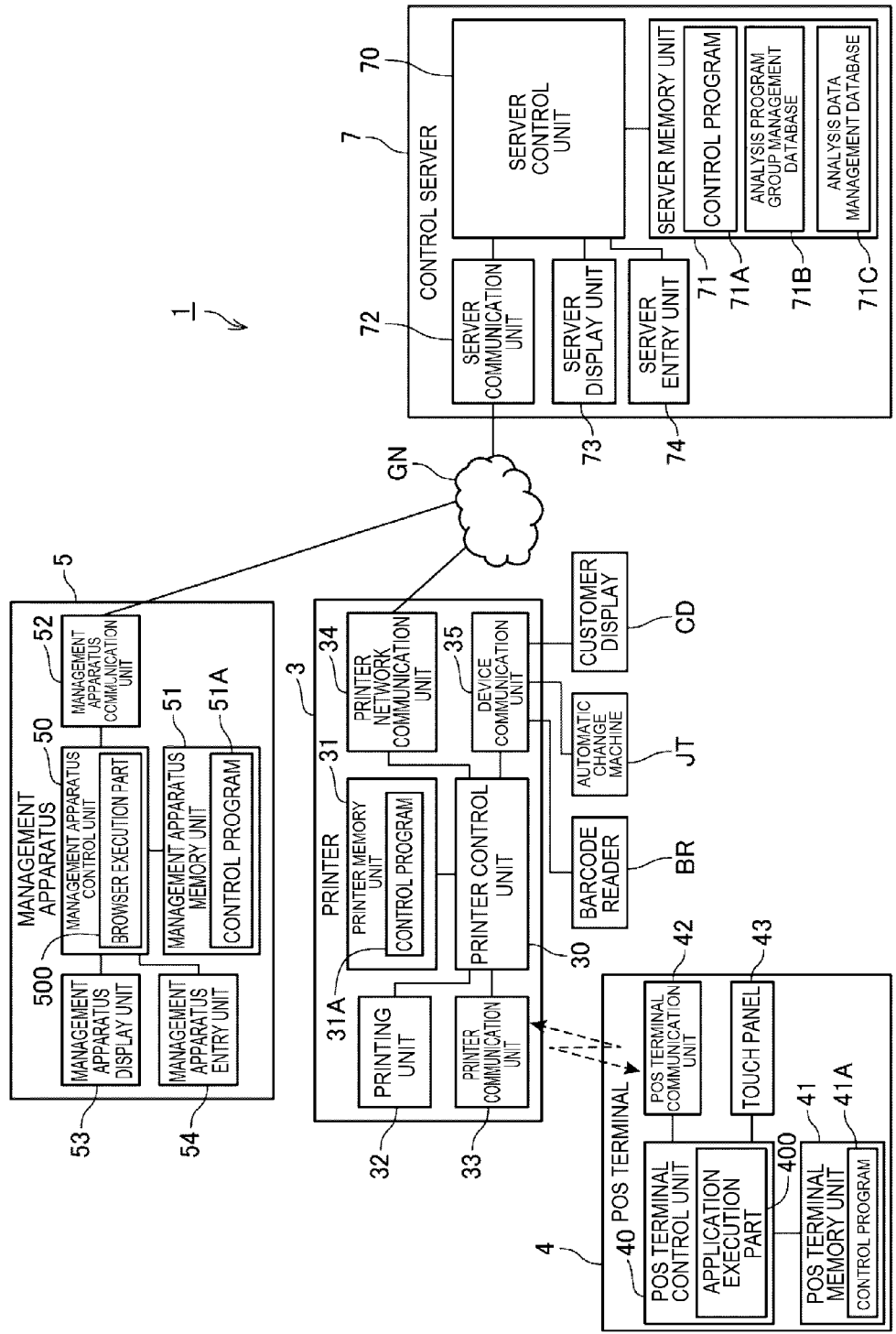
FIG. 2 is a block diagram showing functional configurations of respective apparatuses of the information processing system.

FIG. 2 is the block diagram showing the functional configurations of the respective apparatuses of the information processing system 1.

The POS terminal 4 is e.g. a tablet terminal device with a touch panel 43 provided on the front wide area thereof. Note that the POS terminal 4 may be a stationary terminal such as a desktop type. For accounting in the register counter L, the POS terminal 4 functions as a host computer that executes various kinds of processing relating to the accounting and controls the printer 3.

As shown in FIG. 2, the POS terminal 4 includes a POS terminal control unit 40, a POS terminal memory unit 41, a POS terminal communication unit 42, and the touch panel 43.

The POS terminal control unit 40 includes processors such as a CPU and MPU, memory devices such as a ROM and RAM, and other peripheral circuits as hardware. The POS terminal control unit 40 executes processing in cooperative operation of hardware and software so that the processors thereof may read a control program 41A stored in the ROM or the POS terminal memory unit 41 in the RAM and execute processing. Predetermined applications are installed in the POS terminal 4 in advance. The POS terminal control unit 40 reads and executes the predetermined applications, programs associated with the predetermined applications, and the other programs from the ROM, the POS terminal memory unit 41, or the like, and thereby, functions as an application execution part 400. The application execution part 400 will be described later.

The POS terminal memory unit 41 includes a memory device that stores the control program 41A and other various kinds of data in a non-volatile manner. The POS terminal memory unit 41 may be configured by the ROM forming the POS terminal control unit 40, or configured by another memory device than the ROM. Further, the POS terminal memory unit 41 may include the RAM forming the POS terminal control unit 40.

The POS terminal communication unit 42 includes communication hardware according to a predetermined communication standard, and communicates with the printer 3 under the control of the POS terminal control unit 40. Note that the communication hardware includes hardware such as a communication circuit, communication port, communication board, communication connector as examples. The POS terminal communication unit 42 of the embodiment communicates with the printer 3 according to a predetermined wireless communication standard. The communication standard of the wireless communication between the POS terminal 4 and the printer 3 may be any standard e.g. a standard relating to wireless LAN corresponding to the ad hoc mode, a standard relating to wireless LAN corresponding to the infrastructure mode, a standard relating to near field communication such as Bluetooth, or the like. The Bluetooth is a registered trademark. Note that the POS terminal communication unit 42 may communicate with the printer 3 according to a predetermined wired communication standard.

The touch panel 43 includes a display panel such as a liquid crystal display panel, and a touch sensor superimposed on or integrally provided with the display panel. The display panel displays various images under the control of the POS terminal control unit 40. The touch sensor detects and outputs a touch operation to the POS terminal control unit 40. The POS terminal control unit 40 executes processing corresponding to the touch operation based on input from the touch sensor.

The printer 3 is a thermal printer housing a roll of paper and printing characters, images, etc. by forming dots with a linear thermal head on the housed roll of paper. Note that the printing method of the printer 3 according to the embodiment is the thermal method, however, the printing method of the printer 3 is not limited to the thermal method, but may be another printing method such as an inkjet method. Further, the print head of the printer 3 is not limited to the linear type, but may be a serial type.

As shown in FIG. 2, the printer 3 includes a printer control unit 30, a printer memory unit 31, a printing unit 32, a printer communication unit 33, a printer network communication unit 34, and a device communication unit 35.

The printer control unit 30 includes processors such as a CPU and MPU, memory devices such as a ROM and RAM, and other peripheral circuits as hardware. The printer control unit 30 executes processing in cooperative operation of hardware and software so that the processors thereof may read a control program 31A such as firmware stored in the ROM or the printer memory unit 31 in the RAM and execute processing. Further, font data corresponding to character codes are stored in the ROM.

The printer memory unit 31 includes a memory device that stores the control program 31A and other various kinds of data in a non-volatile manner. The printer memory unit 31 may be configured by the ROM forming the printer control unit 30, or configured by another memory device than the ROM. Further, the printer memory unit 31 may include the RAM forming the printer control unit 30.

The printing unit 32 includes various mechanisms such as a conveyance mechanism that conveys the roll of paper housed in the housing of the printer 3, a printing mechanism of printing an image by forming dots on the roll of paper with the thermal head, and a cutting mechanism of cutting the roll of paper in a predetermined position. The printing unit 32 issues the receipt R by conveying the roll of paper with the conveyance mechanism, printing an image relating to the receipt R on the roll of paper with the printing mechanism, and cutting the roll of paper in the predetermined position with the cutting mechanism under the control of the printer control unit 30.

The printer communication unit 33 includes communication hardware according to a predetermined communication standard, and communicates with the POS terminal 4 under the control of the printer control unit 30. Note that the communication hardware includes hardware such as a communication circuit, communication port, communication board, communication connector as examples. The printer communication unit 33 of the embodiment communicates with the POS terminal 4 according to a predetermined wireless communication standard. Note that the printer communication unit 33 may communicate with the POS terminal 4 according to a predetermined wired communication standard.

The printer network communication unit 34 includes communication hardware for wireless communication such as a network card according to a predetermined communication standard, and communicates with an apparatus connected to the global network GN according to a predetermined communication standard under the control of the printer control unit 30. The apparatus connected to the global network GN includes the management apparatus 5 and the control server 7. The communication standard used by the printer network communication unit 34 for communication includes HTTP, WebSocket, etc. as examples.

The device communication unit 35 includes an interface board having a port according to the USB standard, a port according to another serial communication standard than USB, a port according to a parallel communication standard, a port according to a communication standard relating to wired LAN, and other ports. Devices are connectable to the respective ports. The device communication unit 35 communicates with the device connected to the printer 3 via the port under the control of the printer control unit 30. Note that the device communication unit 35 may include a wireless communication function and wirelessly communicate with the device.

To the printer 3, as devices, the barcode reader BR, a customer display CD, and an automatic change machine JT are connected.

The barcode reader BR reads a barcode attached to a product, a package of the product, or the like and outputs data representing a reading result to the device communication unit 35. The device communication unit 35 outputs data input from the barcode reader BR to the printer control unit 30.

The customer display CD displays information on accounting under the control of the printer control unit 30. The information displayed on the customer display CD may be visually recognized by the customer who makes the payment at the register counter L.

The automatic change machine JT includes a money receiving part in which money received from the customer is entered and a change ejecting part from which money relating to change is ejected, and, when money is entered via the money receiving part, ejects corresponding change from the change ejecting part under the control of the printer control unit 30.

The management apparatus 5 is an apparatus managed by an actor who runs the store to which the store system 2 is applied. The management apparatus 5 may be a desktop apparatus, tablet apparatus, or laptop apparatus. The management apparatus 5 is operated by a person having authority of operation such as an employee of the store or an employee of a company running the store. In the embodiment, the case where the single management apparatus 5 is provided in the single store as shown in FIG. 1 is exemplified. The management apparatus 5 communicates with the control server 7, is provided with a predetermined service from the control server 7, and performs an operation corresponding to the service. For example, the management apparatus 5 is provided with a predetermined service from the control server 7, and manages the sales status in the store, working statuses of employees in the store, etc.

The management apparatus 5 includes a management apparatus control unit 50, a management apparatus memory unit 51, a management apparatus communication unit 52, a management apparatus display unit 53, and a management apparatus entry unit 54.

The management apparatus control unit 50 includes processors such as a CPU and MPU, memory devices such as a ROM and RAM, and other peripheral circuits as hardware. The management apparatus control unit 50 executes processing in cooperative operation of hardware and software so that the processors thereof may read a control program 51A stored in the ROM or the management apparatus memory unit 51 in the RAM and execute processing. A browser is installed in the management apparatus 5 in advance. The management apparatus control unit 50 reads and executes the browser and other associated programs from the ROM, the management apparatus memory unit 51, or the like, and thereby, functions as a browser execution part 500. The browser execution part 500 will be described later.

The management apparatus memory unit 51 includes a memory device that stores the control program 51A and other various kinds of data in a non-volatile manner. The management apparatus memory unit 51 may be configured by the ROM forming the management apparatus control unit 50, or configured by another memory device than the ROM. Further, the management apparatus memory unit 51 may include the RAM forming the management apparatus control unit 50.

The management apparatus communication unit 52 includes communication hardware for wireless communication such as a network card according to a predetermined communication standard, and communicates with an apparatus connected to the global network GN according to a predetermined communication standard under the control of the management apparatus control unit 50. The apparatus connected to the global network GN includes the control server 7. The communication standard used by the management apparatus communication unit 52 for communication includes HTTP, WebSocket, etc. as examples.

The management apparatus display unit 53 includes a display panel such as a liquid crystal display panel, and displays various kinds of information according to the control of the management apparatus control unit 50.

The management apparatus entry unit 54 includes entry means such as operation switches provided in the management apparatus 5, a keyboard connected to the management apparatus 5, and a touch panel, and detects and outputs operation on the entry means by a user (operator) operating the management apparatus to the management apparatus control unit 50. The management apparatus control unit 50 executes processing corresponding to the operation on the entry means based on entry from the management apparatus entry unit 54.

The control server 7 includes a server control unit 70, a server memory unit 71, a server communication unit 72, a server display unit 73, and a server entry unit 74. The server control unit 70 corresponds to a control unit. The server communication unit 72 corresponds to a communication unit.

The server control unit 70 includes processors such as a CPU and MPU, memory devices such as a ROM and RAM, and other peripheral circuits as hardware. The server control unit 70 executes processing in cooperative operation of hardware and software so that the processors thereof may read a control program 71A stored in the ROM or the server memory unit 71 in the RAM and execute processing. The control program 71A corresponds to a program.

The server memory unit 71 includes a memory device that stores the control program 71A and other various kinds of data in a non-volatile manner. The server memory unit 71 may be configured by the ROM forming the server control unit 70, or configured by another memory device than the ROM. Further, the server memory unit 71 may include the RAM forming the server control unit 70. The server control unit 70 stores an analysis program group management database 71B and an analysis data management database 71C in addition to the control program 71A. These databases will be described later.

The server communication unit 72 includes communication hardware for wireless communication such as a network card according to a predetermined communication standard, and communicates with an apparatus connected to the global network GN according to a predetermined communication standard under the control of the server control unit 70. The apparatus connected to the global network GN here includes the printer 3 and the management apparatus 5. The communication standard used by the server communication unit 72 for communication includes HTTP, WebSocket, etc. as examples.

The server display unit 73 includes a display panel, and displays various kinds of information under the control of the server control unit 70.

The server entry unit 74 includes a keyboard, mouse, and other entry means, and detects and outputs operation on the entry means by the user to the server control unit 70. The server control unit 70 executes processing corresponding to the operation on the entry means by the user based on entry from the server entry unit 74.

Next, the operations of the POS terminal 4, the printer 3, and the control server 7 when a payment by a customer is made at the register counter L will be explained.

Figure 3:
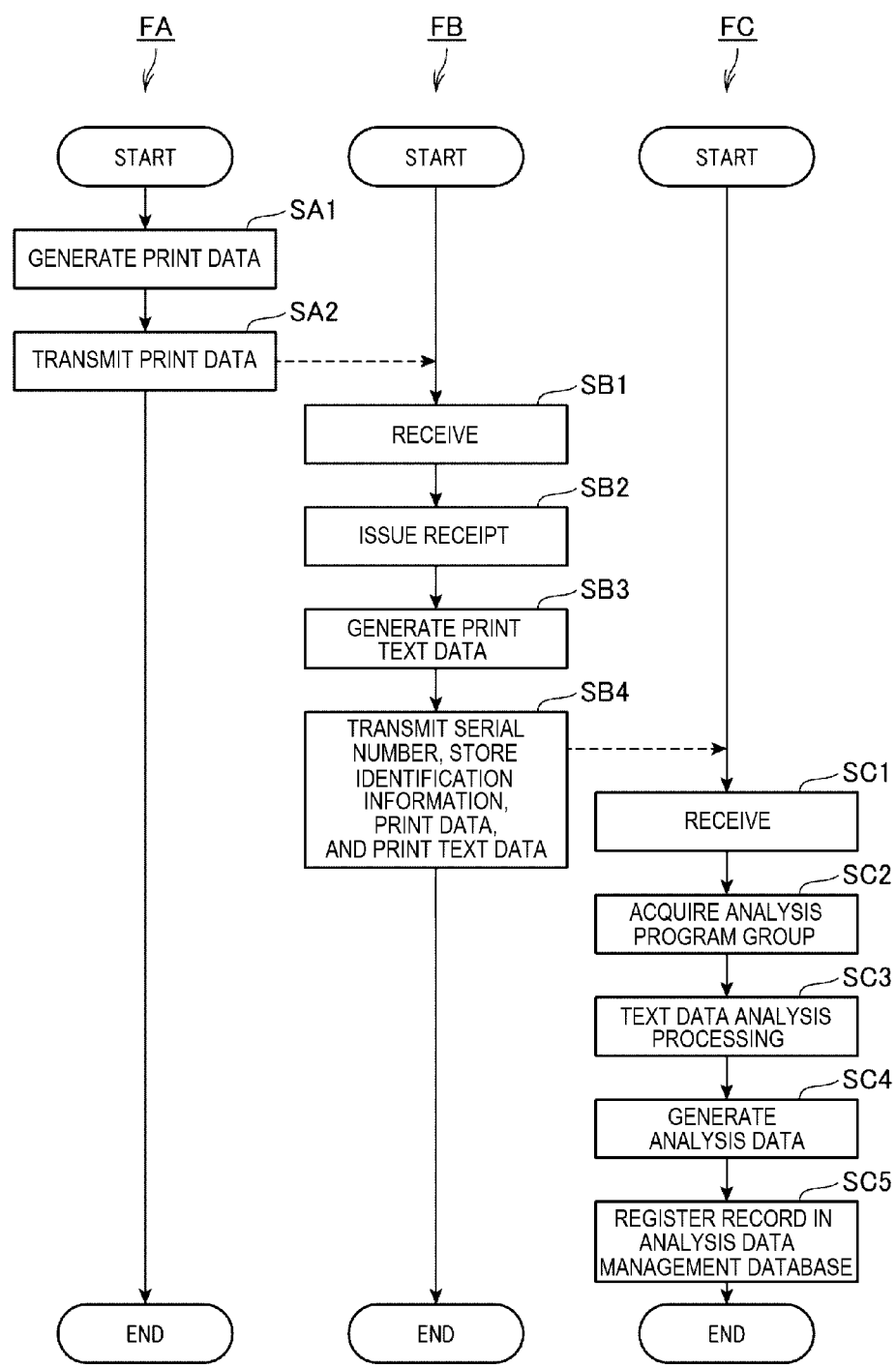
FIG. 3 is a flowchart showing operations of a POS terminal, a printer, and a control server.

FIG. 3 is the flowchart showing the operations of the POS terminal 4, the printer 3, and the control server 7 when a payment is made at the register counter L. The flowchart FA in FIG. 3 shows the operation of the POS terminal 4, the flowchart FB shows the operation of the printer 3, and the flowchart FC shows the operation of the control server 7.

As shown in the flowchart FA in FIG. 3, the application execution part 400 of the POS terminal control unit of the POS terminal 4 executes accounting processing according to the payment by the customer and generates print data ID based on the accounting processing (step SA1).

Specifically, regarding the processing at step SA1, the application execution part 400 displays a user interface in which entry corresponding to the accounting can be made on the touch panel 43. The application execution part 400 generates settlement information on the settlement made in the accounting according to the entry by the person in charge of the register in the touch panel 43 and the input from the printer 3 with the payment by the customer. The specific details of the settlement information will be described later with examples. Then, the application execution part 400 generates the print data ID based on the generated settlement information. The print data ID is data for instructing printing and issuing of the settlement information in a predetermined layout as the receipt R. The print data ID includes a plurality of control commands according to the command system of the printer 3.

Figure 4:
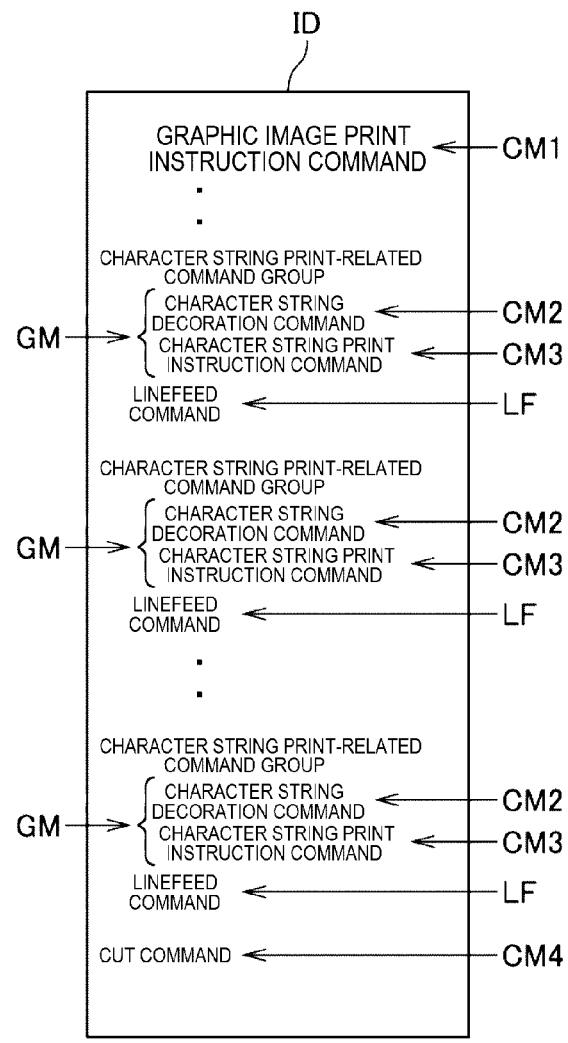
FIG. 4 shows an example of print data.

FIG. 4 shows the example of the print data ID.

As shown in FIG. 4, the print data ID contains a graphic image print instruction command CM1, a character string print-related command group GM, a linefeed command LF, and a cut command CM4. Further, the character string print-related command group GM contains a character string decoration command CM2 and a character string print instruction command CM3.

The graphic image print instruction command CM1 is a control command including a special command code and image data such as bitmap data for instructing printing of a graphic image based on the image data. The image data refers to data holding information on colors of respective dots arranged in a dot matrix form. The graphic image is not an image printed based on font data, but an image printed based on the image data received from an apparatus that functions as a host computer including the POS terminal 4. Logo information J1, which will be described later, corresponds to the graphic image.

The character string print instruction command CM3 contained in the character string print-related command group GM is a control command to instruct printing of a character string for one line. The character string print instruction command CM3 contains a special command code and information of the character string for which printing is instructed. The information of the character string for which printing is instructed is a combination of character codes of one or plurality of characters forming the character string. The character code is expressed by e.g. 1-byte code, the so-called ASCII code. The character string decoration command CM2 contained in the character string print-related command group GM is a control command to instruct a decoration on the character string for which printing is instructed by the character string print instruction command CM3. Decorations on the character string include e.g. right justification, center justification, left justification, bold, underlining, highlighting, black/white inversion, rotation, enlargement, reduction, etc. as examples.

The printer memory unit 31 of the printer 3 stores font data of the respective printable characters. When the printer control unit 30 of the printer 3 prints a character string based on the single character string print-related command group GM, the unit executes the following processing.

First, the printer control unit 30 reads and converts the respective font data corresponding to the respective character codes contained in the character string print instruction command CM3 contained in the single character string print-related command group GM by referring to the ROM, and stores the data in the RAM. Then, the printer control unit 30 decorates the respective font data read from the RAM as designated by the character string decoration command CM2 contained in the single character string print-related command group GM, and develops (stores) the data in the sequence of printing in units of lines in an image buffer formed in the RAM based on the linefeed command LF. Then, the printer control unit 30 reads the respective font data developed in the image buffer, controls the printing unit 32, and prints the character string for one line.

The linefeed command LF is a command to instruct a line feed. The cut command CM4 is a command to instruct cutting of the roll of paper.

As shown in the flowchart FA in FIG. 3, after generating the print data ID at step SA1, the application execution part 400 controls the POS terminal communication unit 42 to transmit the generated print data ID to the printer 3 (step SA2).

As shown in the flowchart FB in FIG. 3, the printer control unit 30 of the printer 3 controls the printer communication unit 33 to receive the print data ID (step SB1). Then, the printer control unit 30 controls the printing unit 32 to issue the receipt R (step SB2). The issued receipt R is handed to the customer.

Figure 5:
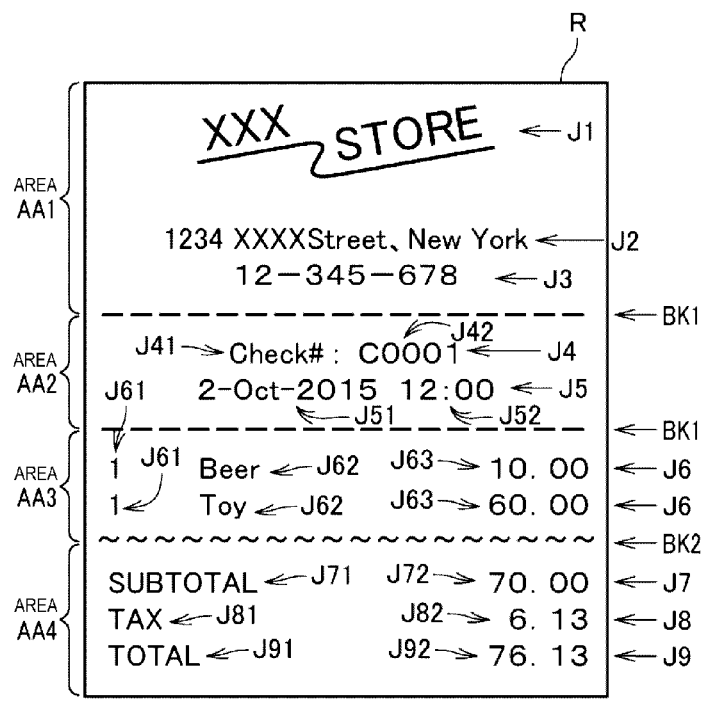
FIG. 5 shows an example of a receipt.

FIG. 5 shows the example of the receipt R issued by the printer 3 based on the print data ID.

Note that, in the embodiment, an object to which the character code is assigned is referred to as "symbol". The symbol includes at least characters including a symbol to which the character code is assigned, mark, blank character to which the character code is assigned, etc.

On the receipt R exemplified in FIG. 5, the logo information J1 formed by designing of the name of the store is printed on the top. The logo information J1 is printed based on the above described graphic image print instruction command CM1.

In the receipt R, store address information J2 representing the address of the store with a character string is printed in a line below the logo information J1. The store address information J2 is printed based on the character string print-related command group GM containing the string decoration command CM2 to designate a decoration relating to the center justification and the character string print instruction command CM3 to instruct printing of the character string representing the address of the store.

In the receipt R, store phone number information J3 representing the phone number of the store with a character string is printed in a line in the next line to the store address information J2. The store phone number information J3 is printed based on the character string print-related command group GM containing the string decoration command CM2 to designate a decoration relating to the center justification and the character string print instruction command CM3 to instruct printing of the character string representing the phone number of the store.

In the receipt R, first area division information BK1 is printed in the next line to the store phone number information J3. The first area division information BK1 is a character string in which a predetermined number of characters "-" are continuously formed within a line. In the receipt R, the printing area is partitioned by the firstly first area division information BK1, and the upper part than the firstly first area division information BK1 is areally divided. Hereinafter, in the receipt R, the area upper than the first area division information BK1 is referred to as "area AA1". The area AA1 contains the logo information J1, the store address information J2, and the store phone number information J3.

In the receipt R, receipt identification-related information J4 is printed in the next line to the firstly first area division information BK1. The receipt identification-related information J4 has receipt identification information J42 representing identification information for identification of the receipt with a character string. The value of the receipt identification information J42 is different with respect to each receipt R. Further, the receipt identification-related information J4 has receipt identification explicit information J41 printed ahead of the receipt identification information J42 and representing information for explicitly indicating that the receipt identification information J42 is the identification information for identification of the receipt as a character string in the same line as the receipt identification information J42. As shown in FIG. 5, the receipt identification explicit information J41 relating to the receipt R is information formed by a character string "Check #:". The receipt identification-related information J4 is printed based on the character string print-related command group GM containing the string decoration command CM2 to designate a decoration relating to the center justification and the following character string print instruction command CM3. The character string print instruction command CM3 is a control command to instruct printing of a character string in which the character string representing the receipt identification explicit information J41, one blank character, and the character string representing the receipt identification information J42 are continuously arranged.

In the receipt R, issue date and time information J5 representing the date and time at which the receipt R was issued with character strings is printed in the next line to the receipt identification-related information J4. The issue date and time information J5 has date information J51 representing the date at which the printer 3 issued the receipt R with a character string and time information J52 representing the time at which the printer 3 issued the receipt R with a character string. The issue date and time information J5 is printed based on the character string print-related command group GM containing the string decoration command CM2 to designate a decoration relating to the center justification and the character string print instruction command CM3 to instruct printing of the character string representing the date and time at which the receipt R was issued. The character string print instruction command CM3 here is a control command to instruct printing of a character string in which the character string representing the date information J51, one blank character, and the character string representing the time information J52 are continuously arranged.

First area division information BK1 is printed in the next line to the issue date and time information J5. In the receipt R, the printing area is partitioned by the firstly first area division information BK1 and the secondly first area division information BK1, and the area surrounded by these pieces of information is areally divided. Hereinafter, in the receipt R, the area surrounded by the firstly first area division information BK1 and the secondly first area division information BK1 is referred to as "area AA2".

In the receipt R, product information J6 is printed in the next line to the secondly first area division information BK1. The product information J6 is information on products purchased by the customer. The product information J6 is printed on the receipt R with respect to each type of products purchased by the customer. Therefore, for example, when the number of types of products purchased by the customer is three, three pieces of product information J6 respectively corresponding to the three types of products are printed. When a plurality of pieces of product information J6 are printed on the receipt R, the plurality of pieces of product information J6 are printed in different lines continuously one line on the other.

The product information J6 has purchase quantity information J61, product name information J62, and unit price information J63. The purchase quantity information J61, the product name information J62, and the unit price information J63 are printed in the same line. The purchase quantity information J61 is information representing the purchase quantity of the corresponding product with a character string. The product name information J62 is information representing the name of the corresponding product with a character string. The unit price information J63 is information representing the unit price of the corresponding product with a character string.

The product information J6 is printed based on the character string print-related command group GM containing the string decoration command CM2 to designate a decoration relating to the left justification and the following character string print instruction command CM3. The character string print instruction command CM3 is a control command to instruct printing of a character string in which the character string representing the purchase quantity information J61, one blank character, the character string representing the product name information J62, one or more blank characters, and the character string representing the unit price information J63 are continuously arranged. The number of blank characters inserted between the character string representing the product name information J62 and the character string representing the unit price information J63 is adjusted so that the position of the unit price information J63 may be located in the tail of "line".

In the receipt R, second area division information BK2 is printed in the next line to the product information J6 printed in the lowermost part. The second area division information BK2 is a character string in which a predetermined number of characters "~" are continuously formed within a line. In the receipt R, the printing area is partitioned by the secondly area division information BK1 and the firstly second area division information BK2, and the area surrounded by these pieces of information is areally divided. Hereinafter, in the receipt R, the area surrounded by the secondly first area division information BK1 and the firstly second area division information BK2 is referred to as "area AA3".

In the receipt R, subtotal amount-related information J7 is printed in the next line to the firstly second area division information BK2. The subtotal amount-related information J7 has subtotal amount information J72 representing the subtotal amount with a character string. Further, the subtotal amount-related information J7 has subtotal amount explicit information J71 printed on the left of the subtotal amount information J72 in the same line as the subtotal amount information J72 and representing information explicitly indicating that the subtotal amount information J72 is information representing the subtotal amount with a character string. As shown in FIG. 5, the subtotal amount explicit information J71 relating to the receipt R is a character string formed by an alphabet character string with eight capitals "SUBTOTAL".

The subtotal amount-related information J7 is printed based on the character string print-related command group GM containing the string decoration command CM2 to designate a decoration relating to the left justification and the following character string print instruction command CM3. The character string print instruction command CM3 is a control command to instruct printing of a character string in which the character string representing the subtotal amount explicit information J71, one or more blank characters, and the character string representing the subtotal amount information J72 are continuously arranged. The number of blank characters inserted between the character string representing the subtotal amount explicit information J71 and the character string representing the subtotal amount information J72 is adjusted so that the position of the subtotal amount information J72 may be located in the tail of "line".

In the receipt R, tax-related information J8 is printed in the next line to the subtotal amount-related information J7. The tax-related information J8 has tax amount information J82 representing the tax amount with a character string. Further, the tax-related information J8 has tax explicit information J81 printed on the left of the tax amount information J82 in the same line as the tax amount information J82 and representing information explicitly indicating that the tax amount information J82 is information representing the tax amount with a character string. As shown in FIG. 5, the tax explicit information J81 relating to the receipt R is a character string formed by an alphabet character string with three capitals "TAX".

The tax-related information J8 is printed based on the character string print-related command group GM containing the string decoration command CM2 to designate a decoration relating to the left justification and the following character string print instruction command CM3. The character string print instruction command CM3 is a control command to instruct printing of a character string in which the character string representing the tax explicit information J81, one or more blank characters, and the character string representing the tax amount information J82 are continuously arranged. The number of blank characters inserted between the character string representing the tax explicit information J81 and the character string representing the tax amount information J82 is adjusted so that the position of the tax amount information J82 may be located in the tail of "line".

In the receipt R, total amount-related information J9 is printed in the next line to the tax-related information J8. The total amount-related information J9 has total amount information J92 representing the total amount with a character string. Further, the total amount-related information J9 has total amount explicit information J91 printed on the left of the total amount information J92 in the same line as the total amount information J92 and representing information explicitly indicating that the total amount information J92 is information representing the total amount with a character string. As shown in FIG. 5, the total amount explicit information J91 relating to the receipt R is a character string formed by an alphabet character string with five capitals "TOTAL".

The total amount-related information J9 is printed based on the character string print-related command group GM containing the string decoration command CM2 to designate a decoration relating to the left justification and the following character string print instruction command CM3. The character string print instruction command CM3 is a control command to instruct printing of a character string in which the total amount explicit information J91, one or more blank characters, and the character string representing the total amount information J92 are continuously arranged. The number of blank characters inserted between the character string representing the total amount explicit information J91 and the character string representing the total amount information J92 is adjusted so that the position of the total amount information J92 may be located in the tail of "line". Hereinafter, in the receipt R, the lower area than the second area division information BK2 is referred to as "area AA4". The area AA4 contains the subtotal amount-related information J7, the tax-related information J8, and the total amount-related information J9.

As described above, in the receipt R, the settlement information is printed in the following layout. That is, in the area AA1, the logo information J1, the store address information J2, and the store phone number information J3 are printed in this order. In the area AA2, the receipt identification-related information J4 and the issue date and time information J5 are printed in this order. In the area AA3, one or more pieces of product information J6 are printed. Further, the product information J6 is printed in the order of the purchase quantity information J61, the product name information J62, and the unit price information J63 within one line. In the area AA4, the subtotal amount-related information J7, the tax-related information J8, and the total amount-related information J9 are printed in this order.

Returning to the explanation of the flowchart FB in FIG. 3, after issuing the receipt R at step SB2, the printer control unit 30 generates print text data ITD based on the print data ID (step SB3). The print text data ITD corresponds to text data. The print text data ITD is text data in which settlement information printed as characters of the settlement information printed on the roll of paper based on the print data ID is described as a text. As below, the processing at step SB3 will be described in detail.

At step SB3, the printer control unit 30 extracts the character string print instruction command CM3 and the linefeed command LF as the control commands relating to printing of character strings from the print data ID. Then, the printer control unit 30 generates the print text data ITD in which the settlement information printed on the receipt R as characters is described as the text based on the extracted control commands. Here, the printer control unit 30 describes the settlement information on which line feeds inserted in printing are reflected in the print text data ITD. Further, the printer control unit 30 describes the settlement information on which the decoration designated by the string decoration command CM2 is not reflected in the print text data ITD. Therefore, even when the center justification and the right justification are instructed as the decorations on the character strings, these decorations are not reflected for description of the text in the print text data ITD.

FIG. 6 shows contents of the print text data ITD generated based on the print data ID relating to the receipt R exemplified in FIG. 5. As is clear from the comparison between FIG. 6 and FIG. 5, in the print text data ITD, the settlement information printed as characters on the receipt R is described as texts on which the sequence in printing and line feeds in printing are reflected.

Note that the logo information J1 is the graphic image and not described in the print text data ITD. That is, other information than the characters printed based on the font data corresponding to the character codes is not described in the print text data ITD.

As shown in the flowchart FB in FIG. 3, after generating the print text data ITD at step SB3, the printer control unit 30 transmits a serial number J11, store identification information J12, the print data ID received at step SB1, and the print text data ITD generated at step SB3 to the control server 7 (step SB4).

The serial number J11 is identification information uniquely assigned to the printer 3 in the manufacturing stage of the printer 3, and stored in a predetermined memory area of the printer memory unit 31 in advance. At step SB4, the printer control unit 30 acquires the serial number J11 stored in the predetermined memory area of the printer memory unit 31. The store identification information J12 is identification information for identification of the store in which the printer 3 is provided, and stored in a predetermined memory area of the printer memory unit 31 in advance. At step SB4, the printer control unit 30 acquires the store identification information J12 stored in the predetermined memory area of the printer memory unit 31.

Note that, in the embodiment, the configuration in which the printer 3 generates the print text data ITD from the print data ID is exemplified, however, the POS terminal 4 may be configured to generate the print text data ITD. In this case, the printer 3 skips the processing at step SB3, and transmits the print text data ITD received from the POS terminal 4 to the control server 7 together with the serial number J11, the store identification information J12, and the print data ID. Or, the control server 7 may be configured to acquire the print data ID from the printer 3 and generate the print text data ITD.

As shown in the flowchart FC in FIG. 3, the server control unit 70 of the control server 7 controls the server communication unit 72 to receive the serial number J11, the store identification information J12, the print data ID, and the print text data ITD transmitted by the printer 3 (step SC1).

Then, the server control unit 70 refers to the analysis program group management database 71B and acquires an analysis program group KPG associated with the serial number J11 having the same value as the value of the serial number J11 received at step SC1 (step SC2).

Figure 7:
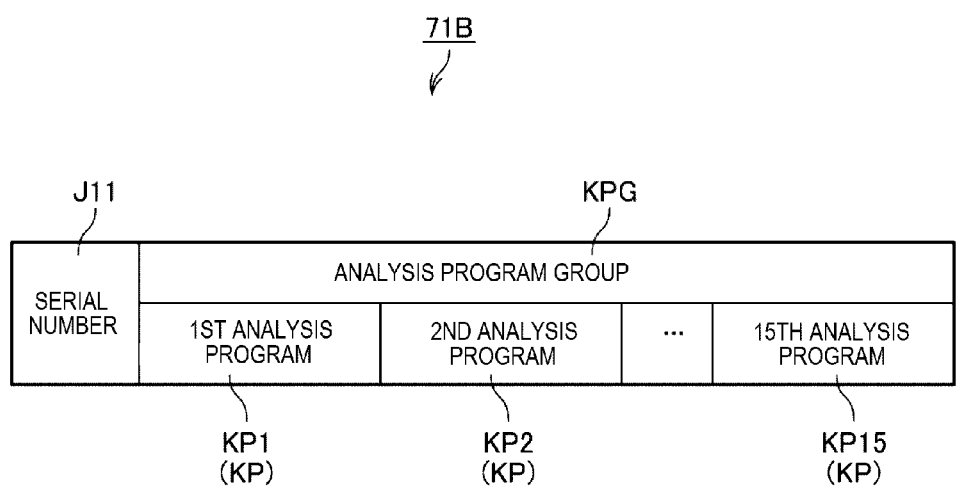
FIG. 7 shows an example of an analysis program group management database.

FIG. 7 schematically shows information of one record of the analysis program group management database 71B.

As shown in FIG. 7, the one record of the analysis program group management database 71B has the serial number J11 and the analysis program group KPG.

In FIG. 7, the analysis program group KPG has 15 analysis programs KP from 1st analysis program KP1 to the 15th analysis program KP15. The respective analysis programs KP will be described later.

Returning to the explanation of the flowchart FC in FIG. 3, the server control unit 70 executes text data analysis processing based on the acquired analysis program group KPG (step SC3).

The text data analysis processing executes processing of acquiring texts representing item values corresponding to items contained in the settlement information from the print text data ITD. Hereinafter, acquisition of the item value texts from the print text data ITD is simply referred to as acquisition of the item values from the print text data ITD. The text data analysis processing extracts the item values from the print text data ITD, converts the notation form of the extracted item values into the notation form that can be utilized by the user as appropriate, and thereby, acquires the item values from the print text data ITD. Note that the item values may include item values for which the notation form is not converted and item values for which the notation form is converted. Accordingly, in the text data analysis processing, the notation forms of the finally acquired item values may include the notation forms extracted from the print text data ITD and the converted notation forms.

In the embodiment, as the items contained in the settlement information, there are 15 items including a customer identification information item, a payment discount information item, a number of customers information item, a refund/no refund information item, a cancel/no cancel information item, a member information item, a payment method information item, an issue date and time information item, a production information item, a receipt identification information item, a sales method information item, a staff information item, a subtotal amount information item, a tax information item, and a total amount information item. These items will be described later.

As described above, the analysis program group KPG of the embodiment has the plurality of analysis programs KP. The analysis program KP is a program described in a predetermined script language, and having a function of acquiring the corresponding item value to one item from the print text data ITD according to an analysis rule shown by the described processing flow. The analysis rule is a rule until the corresponding item value to one item is acquired from the print text data ITD, and includes at least an extraction rule until the item value is extracted from the print text data ITD. Note that the analysis program KP may have an analysis rule including a conversion rule for converting the notation form of the extracted item value in addition to the extraction rule.

The analysis program group KPG acquires the item values for the items in the number corresponding to the number of analysis programs KP from the single piece of print text data ITD. In FIG. 7, the analysis program group KPG consists of the 1st analysis program KP1 to the 15th analysis program KP15. That is, in the case of FIG. 7, the analysis program group KPG has a function of acquiring the item values for the respective 15 items.

In the embodiment, the analysis program group KPG contains the 1st analysis program KP1 having the function of acquiring the item value for the customer identification information item.

The analysis program group KPG contains the 2nd analysis program KP2 having the function of acquiring the item value for the payment discount information item.

The analysis program group KPG contains the 3rd analysis program KP3 having the function of acquiring the item value for the number of customers information item.

The analysis program group KPG contains the 4th analysis program KP4 having the function of acquiring the item value for the refund/no refund information item.

The analysis program group KPG contains the 5th analysis program KP5 having the function of acquiring the item value for the cancel/no cancel information item.

The analysis program group KPG contains the 6th analysis program KP6 having the function of acquiring the item value for the member information item.

The analysis program group KPG contains the 7th analysis program KP7 having the function of acquiring the item value for the payment method information item.

The analysis program group KPG contains the 8th analysis program KP8 having the function of acquiring the item value for the issue date and time information item.

The analysis program group KPG contains the 9th analysis program KP9 having the function of acquiring the item value for the production information item.

The analysis program group KPG contains the 10th analysis program KP10 having the function of acquiring the item value for the receipt identification information item.

The analysis program group KPG contains the 11th analysis program KP11 having the function of acquiring the item value for the sales method information item.

The analysis program group KPG contains the 12th analysis program KP12 having the function of acquiring the item value for the staff information item.

The analysis program group KPG contains the 13th analysis program KP13 having the function of acquiring the item value for the subtotal amount information item.

The analysis program group KPG contains the 14th analysis program KP14 having the function of acquiring the item value for the tax information item.

The analysis program group KPG contains the 15th analysis program KP15 having the function of acquiring the item value for the total amount information item.

Note that the text data analysis processing is executed by the functions of the control program 71A installed in the control server 7 and a program associated with the control program 71A.

For example, the 15th analysis program KP15 is a program for extracting the item value of the total amount information item according to an extraction rule of searching for the character string "TOTAL" contained in the area AA4 of the print text data ITD by keywords and extracting the character string located on the right of the character string "TOTAL" as the item value of the total amount information item except the blank character. Further, the 15th analysis program KP15 is a program for converting the notation form of the item value of the total amount information item according to a conversion rule, when a symbol indicating a grouping separator is contained in the extracted item value, of converting the notation form of the extracted item value into a notation form without the symbol indicating the grouping separator.

Note that the identifiers of 1st to 15th are attached to the analysis programs KP and the identifiers indicate that the items for which the item values are acquired are different. Accordingly, for example, the 1st analysis program KP of a certain analysis program group KPG and the 1st analysis program KP of a different analysis program group KPG from the certain analysis program group KPG do not necessarily have the same analysis rule for acquisition of the item value.

Returning to the explanation of the flowchart FC in FIG. 3, the server control unit 70 generates analysis data KD based on the processing result of the text data analysis processing at step SC3 (step SC4).

The analysis data KD is data in a JSON format in which each of the above described respective item, each of an integrated identification information item, a serial number item, and a store identification information item, and the item value are associated and described. Further, in the analysis data KD, information representing that acquisition of the item value from the print text data ITD was failed is described with respect to each item as appropriate. Note that the information representing that the acquisition of the item value from the print text data ITD was failed includes a null value as an example.

The integrated identification information item is an item with which integrated identification information J13 for unique identification of the analysis data KD is associated as the item value. The serial number item is an item with which the serial number J11 is associated as the item value. The store identification information item is an item with which the store identification information J12 is associated as the item value.

The customer identification information item is an item with which identification information for identification of the customer who payed (hereinafter, referred to as "customer identification information") is associated as the item value. In the payment, a customer card in which the customer identification information is recorded may be read and the customer identification information may be printed on the receipt R. In this case, the settlement information contains the customer identification information and a character string showing the customer identification information is described in the print text data ITD.

The payment discount information item contains a payment discount name information item and a payment discount amount information item.

The payment discount name information item is an item with which information representing the name of the discount applied to the payment (hereinafter, referred to as "payment discount name information") is associated as the item value. The payment discount amount information item is an item with which information representing the amount of the discount applied to the payment (hereinafter, referred to as "payment discount amount information") is associated as the item value. In the payment, a predetermined discount may be applied. In this case, the payment discount name information and the payment discount amount information corresponding to the predetermined discount applied to the payment may be printed on the receipt R. In this case, the settlement information contains the payment discount name information and the payment discount amount information and a character string showing the payment discount name information and a character string showing the payment discount amount information are described as texts in the print text data ITD.

The number of customers information item is an item with which information representing the number of customers who made payments is associated as the item value.

The refund/no refund information item is an item with which information representing whether or not a refund was made is associated as the item value. In the payment, a refund may be made. In this case, the information representing that the refund was made may be printed on the receipt R. In this case, a character string showing that the information representing that the refund was made is described as a text in the print text data ITD.

The cancel/no cancel information item is an item with which information representing whether or not the payment was cancelled is associated as the item value. The payment may be cancelled. In this case, the information representing that the payment was cancelled may be printed on the receipt R. In this case, a character string showing that the information representing that the payment was cancelled is described in the print text data ITD.

The member information item contains a member affiliation information item and a member identification information item.

The member affiliation information item is information representing the name of the service program with which the customer is affiliated as the item value. The member identification information item is identification information for identification of the customer in the service program with which the customer is affiliated as the item value.

The payment method information item contains a payment method name information item and a payment amount information item.

The payment method name information item is an item with which information representing the name of the payment method is associated as the item value. The payment amount information item is information representing the amount paid by the customer using the payment method according to the payment method name information as the item value.

The issue date and time information item is an item with which the issue date and time information J5 is associated as the item value. The issue date and time information item contains an issue date item and an issue time item.

The issue date information item is an item with which the date information J51 is associated as the item value.

The issue time item is an item with which the time information J52 is associated as the item value.

Note that the issue date and time information J5 is a combination of the date information J51 and the time information J52 and represents the date on which the receipt R was issued.

The production information item contains a product name information item, a purchase quantity information item, and a unit price information item.

The product name information item is an item with which the product name information J62 is associated as the item value.

The purchase quantity information item is an item with which the purchase quantity information J61 is associated as the item value.

The unit price information item is an item with which the unit price information J63 is associated as the item value.

The receipt identification information item is an item with which the receipt identification information J42 is associated as the item value. The detailed explanation of the receipt identification information item is omitted.

The sales method information item is an item with which information representing the method of the sale of product is associated as the item value. The detailed explanation of the sales method information item is omitted.

The staff information item is information representing the name of staff in the store or identification information for identification of the staff as the item value. The staff includes the person in charge of accounting and the person who provided services to the customer in the store. The detailed explanation of the staff information item is omitted.

The subtotal amount information item is an item with which the subtotal amount information J72 is associated as the item value. The detailed explanation of the subtotal amount information item is omitted.

The tax information item is an item with which the tax amount information J82 is associated as the item value. The detailed explanation of the tax information item is omitted.

The total amount information item is an item with which the total amount information J92 is associated as the item value. The detailed explanation of the total amount information item is omitted.

Note that the above described item values contain information expressed as character strings, not information expressed as real numeric values, however, the information is treated as the item values in the embodiment.

As shown in the flowchart CF in FIG. 3, the server control unit 70 generates the analysis data KD, and then, registers the generated analysis data KD as one record in the analysis data management database 71C (step SC5).

Figure 8:
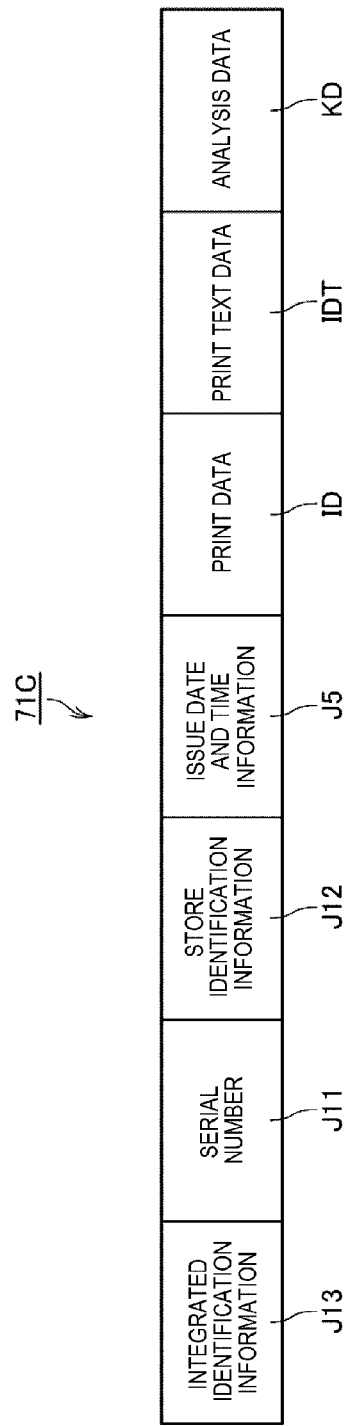
FIG. 8 shows an example of an analysis data management database.

FIG. 8 schematically shows information of the one record of the analysis data management database 71C.

As shown in FIG. 8, the one record of the analysis data management database 71C has the integrated identification information J13, the serial number J11, the store identification information J12, the issue date and time information J5, the print data ID, the print text data ITD, and the analysis data KD.

At step SC5, the server control unit 70 registers a record in which the integrated identification information J13, the serial number J11, the store identification information J12, and the issue date and time information J5 described in association with the corresponding items in the analysis data KD and the received print data ID and the print text data ITD are associated in the analysis data management database 71C.

In the control server 7, a plurality of Web APIs (Application Programming Interfaces) are registered. Further, the control server 7 may perform processing by the registered Web APIs based on the analysis data management database 71C in response to a request from the browser of the external apparatus, and provide information necessary for the user. The user here is e.g. an owner who runs the store, a management company that manages the store, an employee of the management company, a person in charge of the store, or the like.

For example, the user launches the browser of the management apparatus 5 and instructs access to a predetermined URL of the control server 7 relating to display of the user interface for acquisition of the item value from the control server 7. The URL is notified to the user in a predetermined manner in advance. The browser execution part 500 of the management apparatus control unit 50 of the management apparatus 5 accesses the predetermined URL of the control server 7 in response to the instruction by the user. Then, the server control unit 70 of the control server 7 transmits an HTML file for displaying the above described user interface in response to the access to the predetermined URL. The management apparatus 5 displays the above described user interface based on the received HTML file by the management apparatus display unit 53. Here, it is assumed that the total amount information J92 is designated in the user interface displayed by the management apparatus 5. Then, the browser execution part 500 requests the total amount information J92 relating to a specific receipt R to the control server 7 as an HTTP request. The server control unit 70 of the control server 7 transmits the total amount information J92 relating to the specific receipt R as an HTTP response to the management apparatus 5 using the analysis data KD in the analysis data management database 71C. Thereby, the user may utilize the total amount information J92 printed on the specific receipt R.

The item values of the items contained in the settlement information printed on the receipt R may include item values in the different notation forms depending on the regions where the receipts R are issued. The regions here include continents, countries, administrative districts, narrower ranges of land regions, etc. In the embodiment, the item values in the different notation forms depending on the regions include the item values indicating amounts of money and the item values indicating dates. The item values indicating the amounts of money are item values respectively corresponding to the unit price information item of the product information item, the subtotal amount information item, the tax information item, and the total amount information item. That is, the item values indicating the amount of money are the unit price information J63, the subtotal amount information J72, the tax amount information J82, and the total amount information J92. The item value indicating the date is the date information J51.

For example, in the notation of the amount of money, depending on the regions, a symbol "," as a comma symbol may be used as the symbol of the grouping separator or a symbol "." as a dot symbol may be used as the symbol of the grouping separator according to the customs. Further, for example, in the notation of the amount of money, depending on the regions, the symbol "." may be used as the symbol of the decimal separator or the symbol "," may be used as the symbol of the decimal separator. Furthermore, for example, in the notation of the amount of money, depending on the regions, the symbol "¥ (Japanese Yen)" may be used or the symbol "$ (U.S. dollar)" may be used as the currency symbol.

Here, it is assumed that there is the 15th analysis program KP15 having a conversion rule, when the extracted item value contains the the symbol "," indicating the grouping separator, of converting the notation form of the extracted item value into a notation form without the symbol ",". When the 15th analysis program KP15 is applied to an item value "1,00" using the symbol "," as the decimal symbol, the finally acquired item value is converted in a notation form as "100" and the acquired item value becomes a false value.

Or, it is assumed that there is the 15th analysis program KP15 having a conversion rule, when the extracted item value contains the the symbol "$", the symbol "," indicating the grouping separator, and the symbol "." indicating the decimal separator, of converting the notation form of the extracted item value into a notation form without the symbol "$", the symbol "," and without the symbol "." and a character string subsequent to the symbol ".". When the 15th analysis program KP15 is applied to an item value "$10,000.00", the finally acquired item value is "10000" as an item value in a simple and appropriate notation form. However, for example, when the 15th analysis program KP15 is applied to an item value "¥10.000,00" with the symbol "¥" as the currency symbol, the symbol "." as the symbol indicating the grouping separator, and the symbol "," as the symbol indicating the decimal separator, the finally acquired item value is "¥10" as a false item value with the currency symbol.

The item values indicating dates are in different notation forms depending on regions such as a notation form in which year, month, day are sequentially separated by symbols "-" as symbols indicating bars or a notation form in which day, month, year are sequentially separated by the symbols "-".

Further, for example, the item values indicating dates are different in character string itself depending on regions such that the alphabet character string showing the same October is "Oct" or "Okt".

Here, it is assumed that there is the 8th analysis program KP8 having an extraction rule of removing the blank character in the line with the character string "Okt" from the print text data ITD and extracting the character string containing "Okt" as an item value of the issue date item. When the 8th analysis program KP8 is applied to the print text data ITD shown in FIG. 6, the character string "Okt" does not exist in the date information J51, and thereby, it is impossible for the server control unit 70 to extract the date information J51 "2-Oct-2015" as an item value from the print text data ITD shown in FIG. 6.

Or, it is assumed that there is the 8th analysis program KP8 having an extraction rule of "extracting a series of character string including four character strings indicating a year, a symbol "-", two character strings indicating a month, a symbol "-", and two character strings indicating a date as an item value of the issue date item". However, in the 8th analysis program KP8, when the date information J51 is noted by the character string including the day, the symbol "-", the month, the symbol "-", the year such as "DD-MM-YYYY", it is impossible to acquire an item value indicating the date from the print text data ITD.

As described above, regarding the item values in the different notation forms depending on the regions where the receipts R are issued, a situation that it is impossible to appropriately or precisely acquire the item values or accurately analyze settlement information may occur in some receipts R. Accordingly, the control server 7 executes the following operations, and thereby, may appropriately or precisely acquire the item values in the different notation forms depending on regions from the print text data ITD and improve analysis accuracy of the settlement information printed on the receipts R.

As below, the operations of the control server 7 will be explained in an operation relating to the item values indicating the amount of money and an operation relating to the item value indicating the date.

Item Values Indicating Amount of Money

Figure 9:
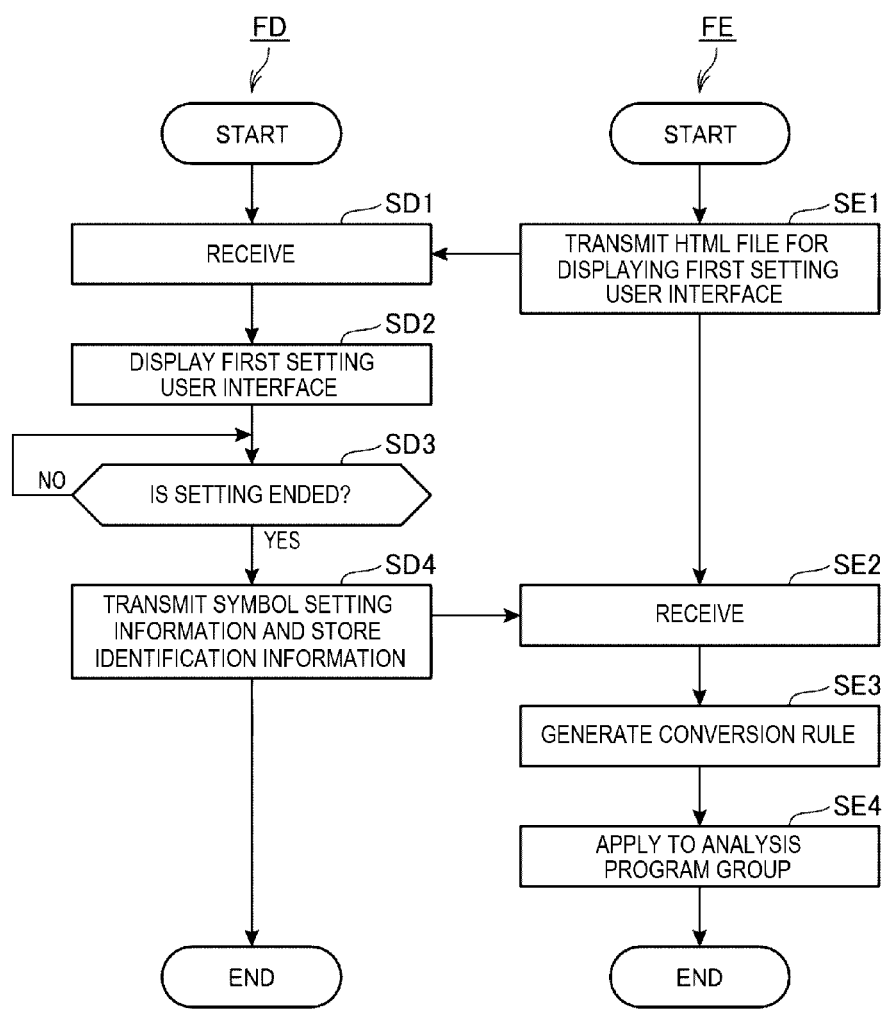
FIG. 9 is a flowchart showing operations of a management apparatus and the control server.

FIG. 9 is the flowchart showing the operations of the management apparatus 5 and the control server 7. In FIG. 9, a flowchart FD shows the operation of the management apparatus 5 and a flowchart FE shows the operation of the control server 7.

For convenience of understanding, the flowcharts in FIG. 9 show from processing of transmitting an HTML file for displaying a first setting user interface UI1 for setting the notation form of the items indicating the amount of money by the control server 7 to the management apparatus 5. However, before the control server 7 transmits the HTML file, the management apparatus 5 and the control server 7 perform processing for transmitting the HTML file. First, prior to the explanation of the flowcharts in FIG. 9, the processing before transmitting the HTML file for displaying the first setting user interface UI1 to the management apparatus 5 is explained.

The user launches the browser of the management apparatus 5 and instructs access to a predetermined URL of the control server 7 relating to display of the first setting user interface UI1. Note that the URL is notified to the user in a predetermined manner in advance.

The browser execution part 500 of the management apparatus control unit 50 of the management apparatus 5 accesses the predetermined URL of the control server 7 relating to display of the first setting user interface UI1 in response to the instruction by the user.

The server control unit 70 of the control server 7 transmits an HTML file for displaying a first entry user interface for entry of a user ID for displaying the first setting user interface UI1 and a password corresponding to the user ID in response to the access to the predetermined URL by the browser execution part 500 to the management apparatus 5 by the server communication unit 72.

When the HTML file for displaying the first entry user interface is received by the management apparatus communication unit 52, the browser execution part 500 displays the first entry user interface based on the received HTML file by the management apparatus display unit 53. The first entry user interface has an entry field for entry of the user ID, an entry field for entry of the password corresponding to the user ID, and an enter button for settlement of the entry in the entry fields. When the user ID and the password are entered in the corresponding entry fields and the enter button is operated, the browser execution part 500 transmits the entered user ID and password to the control server 7 by the management apparatus communication unit 52.

When the combination of the user ID and the password received by the server communication unit 72 coincides with a combination stored in advance, the server control unit 70 of the control server 7 transmits an HTML file for displaying a second entry user interface to the management apparatus 5. The second entry user interface is a user interface for displaying store-related information on single stores selectably in a list in the number of stores associated with the user ID entered in the first entry user interface. The store-related information is information including a brand name of the store, a name of the store, an address of the store, store identification information J12, serial number J11 of the printer 3 introduced in the store, etc. The store-related information is appropriately generated and associated with appropriate user IDs.

When the HTML file for displaying the second entry user interface is received by the management apparatus communication unit 52, the browser execution part 500 of the management apparatus 5 displays the second entry user interface based on the received HTML file by the management apparatus display unit 53. When the single piece of store-related information is selected in the second entry user interface, the browser execution part 500 transmits the store identification information J12 contained in the selected store-related information to the control server 7.

When receiving the store identification information J12, the server control unit 70 of the control server 7 transmits an HTML file for displaying the first setting user interface UI1 relating to one or more printers 3 introduced in the store represented by the store identification information J12 to the management apparatus 5 (step SE1).

When receiving the HTML file for displaying the first setting user interface UI1 (step SD1), the browser execution part 500 of the management apparatus 5 displays the first setting user interface UI1 on the management apparatus display unit 53 based on the received HTML file (step SD2).

Figure 10:
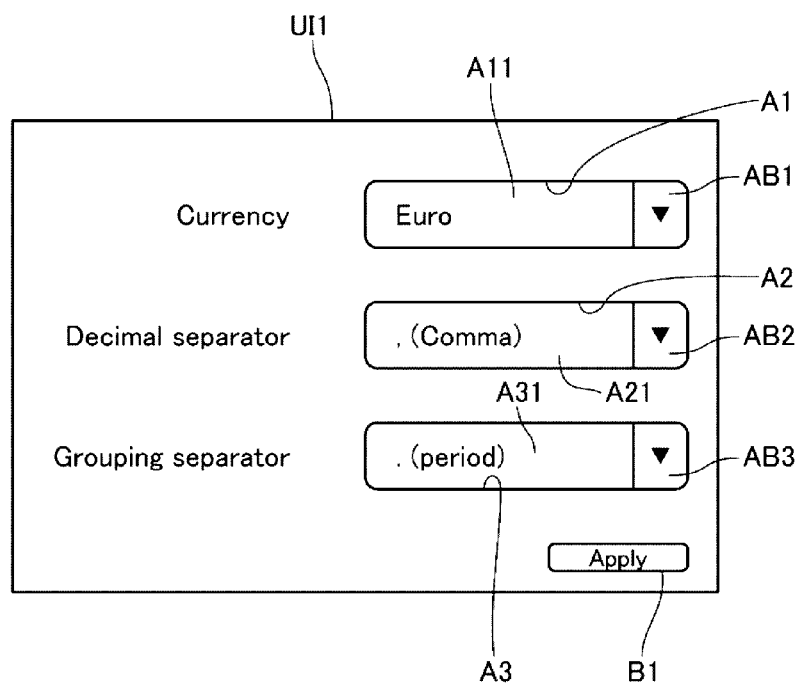
FIG. 10 shows an example of a first setting user interface.

FIG. 10 shows the example of the first setting user interface UI1.

As shown in FIG. 10, the first setting user interface UI1 has a currency symbol field A1 for setting a currency symbol, a decimal separator field A2 for setting a symbol indicating a decimal separator, and a grouping separator field A3 for setting a symbol indicating a grouping separator.

The currency symbol field A1 has a display field A11 and a list display button AB1.

The list display button AB1 is a button for displaying names of currency symbols as candidates for setting in a list. When selectively operated by the user, the list display button AB1 selectably displays name information representing the names of the currency symbols as candidates for setting in a list in the first setting user interface UI1. The names of the currency symbols represented by the name information displayed in the list include Yen, US Dollar, Euro, Pound Sterling, etc. as examples. Note that the names of the currency symbols displayed in the list by the list display button AB1 are not limited to those noted in English, but may be noted in currency codes including JPY and EUR. Or, the list display button AB1 may also display the currency symbols corresponding to the names in association with the name information of the currency symbols.

The display field A11 is a field for displaying the selected name information of the name information displayed in the list by the list display button AB1. FIG. 10 shows the display field A11 when the name information representing the name "Euro" is selected.

The decimal separator field A2 has a display field A21 and a list display button AB2.

The list display button AB2 is a button for displaying candidates of symbols set as decimal separators in a list. When selectively operated by the user, the list display button AB2 selectably displays the candidates of the symbols set as decimal separators in a list in the first setting user interface UI1. The candidates of the symbols set as decimal separators include at least a symbol "," indicating the symbol of the comma, a symbol "." indicating the symbol of the dot, a symbol "'" indicating the symbol of an apostrophe, and a symbol "•" indicating the symbol of a bullet point. Note that the list display button AB2 may also display a character string showing the name of the symbol in association with the symbol.

The display field A21 is a field for displaying the selected symbol of the symbols displayed in the list by the list display button AB2. FIG. 10 shows the display field A21 when the symbol "," is selected.

The grouping separator field A3 has a display field A31 and a list display button AB3.

The list display button AB3 is a button for displaying candidates of symbols set as grouping separators in a list. When selectively operated by the user, the list display button AB3 selectably displays the candidates of the symbols set as grouping separators in a list in the first setting user interface UI1. The candidates of the symbols set as grouping separators include at least a symbol "," indicating the symbol of the comma, a symbol "." indicating the symbol of the dot, a symbol "'" indicating the symbol of the apostrophe, and a symbol "•" indicating the symbol of the bullet point. Note that the list display button AB3 may also display a character string showing the name of the symbol in association with the symbol.

The display field A31 is a field for displaying the selected symbol of the symbols displayed in the list by the list display button AB3. FIG. 10 shows the display field A31 when the symbol "." is selected.

The first setting user interface UI1 has the currency symbol field A1, the decimal separator field A2, and the grouping separator field A3, and additionally an apply button B1. The apply button B1 is a button for applying the symbols selectively set in the respective currency symbol field A1, decimal separator field A2, and grouping separator field A3 as symbols used for the notation forms of the item values indicating the amount of money. The apply button B1 is operable when symbols are selected in at least the decimal separator field A2 and the grouping separator field A3. This is because the amount of money may be noted without the currency symbol in some receipts R. It is preferable that the apply button B1 is inoperable unless different symbols are selected in the decimal separator field A2 and the grouping separator field A3. This is because, generally, in the notation of the amount of money, different symbols from each other are used for proper recognition of the decimal separator and the grouping separator. On the assumption, the control server 7 may convert the notation forms of the item values indicating the amount of money in the text data analysis processing.

Referring to the flowcharts shown in FIG. 9, the browser execution part 500 of the management apparatus 5 determines whether or not to end the setting of the notation forms of the item values indicating the amount of money (step SD3). For example, when the apply button B1 is operated in the first setting user interface UI1, the browser execution part 500 determines to end the setting and, when the apply button B1 is not operated, determines not to end the setting.

When determining not to end the setting of the notation forms of the item values indicating the amount of money (step SD3: No), the browser execution part 500 executes the processing at step SD3 again. On the other hand, when determining to end the setting of the notation forms of the item values indicating the amount of money (step SD3: Yes), the browser execution part 500 associates symbol setting information representing the symbols set in the respective fields of the first setting user interface UI1 with the store identification information J12 and transmits the information to the control server 7.

When receiving the symbol setting information and the store identification information J12 from the management apparatus 5 (step SE2), the server control unit 70 of the control server 7 generates a conversion rule based on the received symbol setting information (step SE3). Note that the reception of the symbol setting information corresponds to acquisition of the setting relating to the notation form.

Here, step SE3 is explained.

For explanation, it is assumed that, at step SE2, the server control unit 70 receives the symbol setting information representing that the symbol "$" indicating the currency symbol of dollar is set in the currency symbol field A1, the symbol "." is set in the decimal separator field A2, and the symbol "," is set in the grouping separator field A3 from the management apparatus 5.

In this case, for example, the server control unit 70 generates a conversion rule of "converting the notation form of the extracted item value into a notation form without the symbol "$" and the symbol "," and without the symbol "." and the character string subsequent to the symbol ".". According to the conversion rule, for example, the server control unit 70 may convert the notation forms of the item values of "$10,000.00" into an appropriate notation form as "10000" that is simple and the same in numeric value between before and after the conversion.

Note that the conversion rule is just an example, and may be generated based on the received symbol setting information as long as the conversion into an appropriate notation form may be performed.

After generating the conversion rule based on the received symbol setting information, the server control unit 70 of the control server 7 applies the generated conversion rule to the analysis program group KPG based on the store identification information J12 received at step SE2 (step SE4).

The analysis program group KPG to which the rule is applied at step SE4 is the analysis program group KPG corresponding to the serial number J11 associated with the store identification information J12 received at step SE2. The server control unit 70 uses the store identification information J12 received at step SE2 as a key and specifies one or more records having the store identification information J12 from the analysis data management database 71C. Then, the server control unit 70 acquires the serial numbers J11 of the printers 3 from the respective specified one or more records. Then, the server control unit 70 uses the respective acquired one or more serial numbers J11 as keys and specifies records having the serial numbers J11 as the keys from the analysis program group management database 71B. The server control unit 70 applies the conversion rule to the analysis program group KPG of the specified record. The server control unit 70 changes the conversion rules of the analysis programs KP for acquisition of the item values indicating the amount of money of the 15 analysis programs KP of the analysis program group KPG into the generated conversion rules. That is, the server control unit 70 changes the conversion rules of the 9th analysis program KP9, the 10th analysis program KP10, the 13th analysis program KP13, the 14th analysis program KP14, and the 15th analysis program KP15 of the one analysis program group KPG into the generated conversion rules.

After applying the generated conversion rule to the analysis program group KPG, the server control unit 70 performs text data analysis processing using the analysis program group KPG after the application on the print text data ITD received after the application. That is, the server control unit 70 acquires the item values indicating the amount of money from the print text data ITD based on the setting of the notation forms of the item values indicating the amount of money made in the management apparatus 5.

As described above, the server control unit 70 generates the conversion rule and applies the generated conversion rule to the analysis program group KPG based on the symbol setting information received from the management apparatus 5, and thereby, may acquire the item values indicating the amount of money in the appropriate notation form from the print text data ITD after the application. Therefore, the server control unit 70 may acquire the items indicating the amount of money in the different notation forms depending on the regions in the appropriate notation form from the print text data ITD, and thus, the analysis accuracy of the settlement information printed on the receipt R is improved.

As shown in FIG. 5, in one receipt R, the probability that all notation forms of the item values indicating the amount of money are the same is high. Accordingly, the server control unit 70 may generate one common conversion rule, not generating the conversion rules for the respective 9th analysis program KP9, 10th analysis program KP10, 13th analysis program KP13, 14th analysis program KP14, and 15th analysis program KP15. Therefore, the server control unit 70 may quickly change the analysis program group KPG while reducing the processing load relating to the change of the analysis program group KPG based on the symbol setting information.

The symbol of the decimal separator is at least one of the symbol "." as the dot symbol, the symbol "," as the comma symbol, the symbol "'" as the apostrophe symbol, and the symbol "•" as the bullet point symbol. The server control unit 70 may acquire the item values indicating the amount of money in which the symbol of the decimal separator is noted by at least one of these symbols in the appropriate notation form from the print text data ITD. Further, regarding the symbol of the grouping separator, as is the case of the symbol of the decimal separator, the server control unit 70 may acquire the item values indicating the amount of money in which the symbol of the grouping separator is noted by at least one of these symbols in the appropriate notation form from the print text data ITD.

Note that the processing at step SE3 and step SE4 is processing of generating and applying the conversion rule of the analysis rules of one analysis program KP. However, the processing at step SE3 and step SE4 may be processing of generating the analysis rule itself including the conversion rule and applying the rule to the analysis program group KPG. In the case of the processing, it is necessary for the server control unit 70 to generate the respective analysis rules of the 9th analysis program KP9, the 10th analysis program KP10, the 13th analysis program KP13, the 14th analysis program KP14, and the 15th analysis program KP15 for one analysis program group KPG. This is because, even when the conversion rules are the same, the extraction rules are highly likely different depending to the items. In this case, the server control unit 70 may generate the extraction rule based on the symbol setting information. The extraction rule generated here includes the following rule as an example.

For example, it is assumed that the symbol setting information representing that the symbol "$" indicating the currency symbol of dollar is set in the currency symbol field A1, the symbol "." indicating the dot symbol is set in the decimal separator field A2, and the symbol "," indicating the comma symbol is set in the grouping separator field A3 is received from the management apparatus 5. In this case, regarding the extraction rule of the 15th analysis program KP15, the server control unit 70 generates an extraction rule of 'searching for the character string "TOTAL" contained in the area AA4 of the print text data ITD by keywords and extracting the character string located on the right of the symbol "$" as the item value of the total amount information item in the line having the character string "TOTAL"'. When "TOTAL $10,000.00" is noted in one line in the print text data ITD, in the extraction rule of 'extracting the character string located on the right of the character string "TOTAL"', the 15th analysis program KP15 may extract "$" or may extract "10,000.00" as the item value. Accordingly, according to the extraction rule in consideration of the above described symbol setting information, even when a blank character or the like intervenes between the numeric value and the currency symbol like "TOTAL $10,000.00", the server control unit 70 may appropriately extract the item value of the total amount information item.

Item Value Indicating Date

Next, processing by the control server 7 on the item value indicating the date will be explained.

Figure 11:
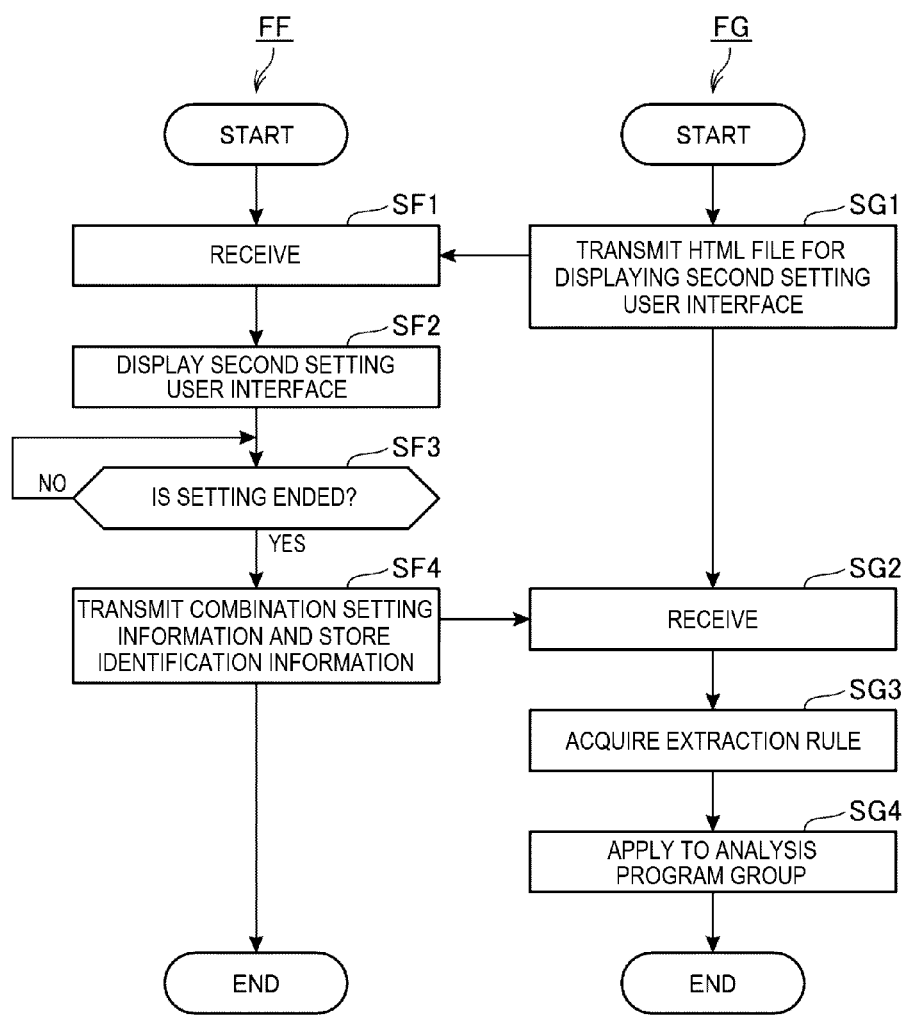
FIG. 11 is a flowchart showing operations of the management apparatus and the control server.

FIG. 11 is the flowchart showing operations of the management apparatus 5 and the control server 7. In FIG. 11, a flowchart FF shows the operation of the management apparatus 5 and a flowchart FG shows the operation of the control server 7.

The flowcharts in FIG. 11 show from processing of transmitting an HTML file for displaying a second setting user interface UI2 for setting the notation form of the item value indicating the date by the control server 7 to the management apparatus 5 (step SG1). The management apparatus 5 and the control server 7 perform the same processing as the processing relating to the item values indicating the amount of money before the control server 7 performs the processing of transmitting the HTML file.

When receiving the store identification information J12 from the management apparatus 5, the server control unit 70 of the control server transmits the the HTML file for displaying the second setting user interface UI2 relating to one or more printers 3 introduced in the store represented by the store identification information J12 to the management apparatus 5 (step SG1).

When receiving the HTML file for displaying the second setting user interface UI2 (step SF1), the browser execution part 500 of the management apparatus 5 displays the second setting user interface UI2 on the management apparatus display unit 53 based on the received HTML file (step SF2).

Figure 12:
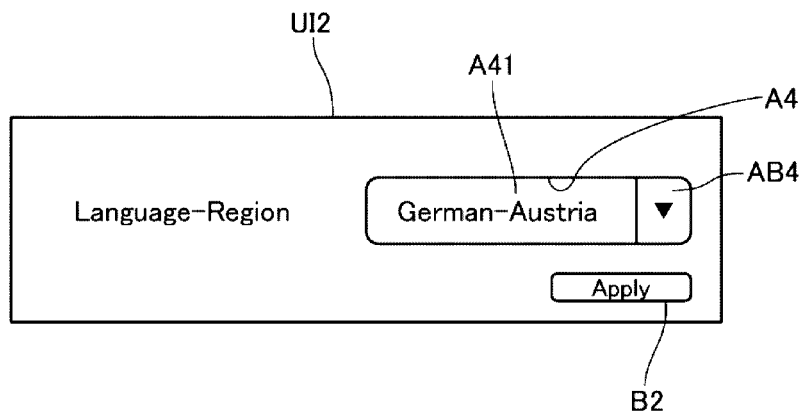
FIG. 12 shows an example of a second setting user interface.

FIG. 12 shows the example of the second setting user interface UI2.

As shown in FIG. 12, the second setting user interface UI2 has a combination field A4 for setting a combination of a language and a country where the language is mainly used (hereinafter, referred to as "corresponding language country").

The combination field A4 has a display field A41 and a list display button AB4.

The list display button AB4 is a button for displaying combinations of languages as candidates for setting and corresponding language countries in a list. When selectively operated by the user, the list display button AB4 selectably displays combination information representing the combinations of languages as candidates for setting and corresponding language countries in the list in the second setting user interface UI2. The combinations of languages and corresponding language countries are appropriate combinations based on preliminary surveys or the like. For example, the combinations of languages and corresponding language countries include German-Austria, German-Switzerland, English-United States, and Japanese-Japan as examples.

The display field A41 is a field for displaying the selected combination information of the combination information displayed in the list by the list display button AB4. FIG. 12 shows the display field A41 when the combination information of German-Austria is selected.

The second setting user interface UI2 has the combination field A4 and additionally an apply button B2. The apply button B2 is a button for applying the combination of the language and the corresponding language country selectively set in the combination field A4 as a combination relating to the notation form of the item value indicating the date.

Referring to the flowcharts shown in FIG. 11, the browser execution part 500 of the management apparatus 5 determines whether or not to end the setting of the notation form of the item value indicating the date (step SF3). For example, when the apply button B2 is operated in the second setting user interface UI2, the browser execution part 500 determines to end the setting and, when the apply button B2 is not operated, determines not to end the setting.

When determining not to end the setting of the notation form of the item value indicating the date (step SF3: No), the browser execution part 500 executes the processing at step SF3 again. On the other hand, when determining to end the setting of the notation form of the item value indicating the date (step SF3: Yes), the browser execution part 500 associates the combination setting information representing the combination of the language and the corresponding language country set in the second setting user interface UI2 with the store identification information J12 and transmits the information to the control server 7 (step SF4).

When receiving the combination setting information and the store identification information J12 from the management apparatus 5 (step SG2), the server control unit 70 of the control server 7 acquires an extraction rule suitable for the combination based on the received combination setting information (step SG3). Note that the reception of the combination setting information corresponds to acquisition of setting relating to the notation form.

Here, step SG3 is explained.

When receiving the combination setting information, the server control unit 70 acquires an extraction rule suitable for the combination of the language and the corresponding language country represented by the received combination setting information with reference to a predetermined database. The predetermined database stores a plurality of records in which the combinations of languages and corresponding language countries and extraction rules suitable for the combinations are associated as information. For example, the predetermined database stores a record in which a combination of English-United States and an extraction rule of "extracting a character string containing one of character strings of Jan, Feb, Mar, Apr, May, Jun, Jul, Aug, Sep, Oct, Nov, and Dec as the item value of the issue date item except blank characters in the line having one of the character strings" are associated as information. The correspondence relationship between the combination and the extraction rule is appropriately determined in advance by prior tests, simulations, or the like. Note that the control server 7 may store the predetermined database using the server memory unit 71 and acquire the extraction rule from the server memory unit 71, or may access the predetermined database using the server communication unit 72 and acquire the extraction rule.

Further, for example, when receiving the combination information of English-United Kingdom, the server control unit 70 acquires an extraction rule of "extracting a series of character strings of two character strings indicating the date, the symbol "-", two character strings indicating the month, the symbol "-", and four character strings indicating the year" from a predetermined database. According to the extraction rule, for example, the server control unit 70 may acquire the item value of the notation form "DD-MM-YYYY" from the print text data ITD.

When acquiring the extraction rule based on the received combination setting information, the server control unit 70 of the control server 7 applies the acquired extraction rule to the analysis program group KPG based on the store identification information J12 received at step SG2 (step SG4). The analysis program group KPG to which the rule is applied at step SG4 is the analysis program group KPG corresponding to the serial number J11 associated with the store identification information J12 received at step SG4. As described at step SE4 in FIG. 9, the server control unit 70 specifies one or more analysis program groups KPG to which the rule is applied based on the store identification information J12 received at step SG2 and applies the extraction rule to the analysis program group KPG of the specified record. The server control unit 70 changes the extraction rule of the eighth analysis program KP8 for acquisition of the item value indicating the date of the 15 analysis programs KP of the analysis program group KPG to the acquired extraction rule. Note that the analysis rule of the eighth analysis program KP8 contains a rule of extracting the item value indicating the date and an extraction rule of extracting time information J52 as the item value from the print text data ITD. The server control unit 70 changes the extraction rule of extracting the item value indicating the date as an object to change.

After applying the acquired extraction rule to the analysis program group KPG, the server control unit 70 performs text data analysis processing using the analysis program group KPG after the application on the print text data ITD received after the application. That is, the server control unit 70 acquires the item value indicating the date from the print text data ITD based on the setting of the notation form of the item value indicating the date made in the management apparatus 5.

As described above, the server control unit 70 acquires the extraction rule and applies the acquired extraction rule to the analysis program group KPG based on the combination setting information received from the management apparatus 5, and thereby, may properly acquire the item value indicating the date from the print text data ITD after the application. Therefore, the server control unit 70 may properly acquire the items indicating the date in the different notation forms depending on regions from the print text data ITD, and thus, the analysis accuracy of the settlement information printed on the receipt R is improved.

Note that the processing at step SG3 shows processing of acquiring the extraction rule from the predetermined database, however, may generate the extraction rule based on the combination setting information. Further, the processing at step SG3 and step SG4 is processing of acquiring and applying the extraction rule of the analysis rules of one analysis program KP. However, the processing at step SG3 and step SG4 may be processing of acquiring the analysis rule itself including the extraction rule from the predetermined database and applying the rule to the analysis program group KPG.

In the explanation using the flowcharts in FIGS. 9 and 11, the case where the analysis program group KPG is changed in units of stores is exemplified, however, may be changed in units of printers 3.

In the above description, the configuration in which the management apparatus 5 displays the first setting user interface UI1 is explained, however, a configuration in which a user interface containing the first setting user interface UI1 is displayed may be employed. In this case, the management apparatus 5 receives an HTML file for displaying the user interface containing the first setting user interface UI1. The same may be applied to the second setting user interface UI2.

As described above, the control server 7 includes the server communication unit 72 to which the management apparatus 5 and the printer 3 that prints the settlement information and issues the receipt R are connectable, and the server control unit 70 that acquires the print text data ITD on the settlement information from the printer 3 via the server communication unit 72 and acquires the item values of the items contained from the settlement information from the print text data ITD. The server control unit 70 acquires the setting relating to the notation forms of the item values in the different notation forms depending on the regions from the management apparatus 5, and acquires the item values in the different notation forms depending on the regions from the print text data ITD based on the acquired setting.

According to the configuration, the server control unit 70 acquires the item values in the different notation forms depending on the regions from the print text data ITD based on the setting relating to the notation form acquired from the management apparatus 5, and thereby, may acquire the item values in the different notation forms depending on the regions from the print text data ITD in the appropriate notation form or properly. Therefore, the server control unit 70 may improve the analysis accuracy of the settlement information printed on the receipt R.

The setting relating to the notation form is at least one of the currency, the decimal separator, and the grouping separator for notation of the item values indicating the amount of money.

According to the configuration, the item values indicating the amount of money may be acquired from the print text data ITD in the appropriate notation form. Therefore, the server control unit 70 may improve the analysis accuracy of the settlement information printed on the receipt R.

The symbol of the decimal separator includes at least one symbol of the dot, the comma, the apostrophe, and the bullet point.

According to the configuration, the item values indicating the amount of money with the decimal separator symbol noted by at least one symbol of these symbols may be acquired from the print text data ITD in the appropriate notation form.

The symbol of the grouping separator includes at least one symbol of the dot, the comma, the apostrophe, and the space.

According to the configuration, the server control unit 70 may acquire the item values indicating the amount of money with the grouping separator symbol noted by at least one symbol of these symbols may be acquired from the print text data ITD in the appropriate notation form.

The setting relating to the notation form is a setting relating to the notation form of the item value indicating the date when the printer 3 issues the receipt R.

According to the configuration, the item value indicating the date may be properly acquired from the print text data ITD. Therefore, the server control unit 70 may improve the analysis accuracy of the settlement information printed on the receipt R.

Modified Example 1

Next, modified example 1 is explained.

In the modified example 1, the actor that displays the first setting user interface UI1 and the second setting user interface UI2 is different from that of the above described embodiment.

In the modified example 1, the server control unit 70 displays the first setting user interface UI1 and the second setting user interface UI2 using the server display unit 73.

According to the configuration, the same effects as those of the above described embodiment are exerted.

Modified Example 2

Next, modified example 2 is explained.

In the modified example 2, the actor that displays the first setting user interface UI1 and the second setting user interface UI2 is different from that of the above described embodiment or the modified example 1.

In the modified example 2, the POS terminal 4 displays the first setting user interface UI1 and the second setting user interface UI2 on the touch panel 43. In the modified example 2, the POS terminal 4 corresponds to the control apparatus. In this case, a browser is installed in the POS terminal 4 and the POS terminal control unit 40 has the function of the browser execution part 500.

According to the configuration, the same effects as those of the above described embodiment and the modified example 1 are exerted.

Note that the above described embodiment and respective modified examples show just certain aspects of the present disclosure, and modification and application can arbitrarily be made within the scope of the present disclosure.

For example, the functions of the POS terminal control unit 40, the printer control unit 30, the management apparatus control unit 50, and the server control unit 70 may be realized by a plurality of processors or semiconductor chips.

Further, for example, a control method of the control server 7 as an aspect is realized in the above described information processing apparatus using a computer of the control server 7 or an external apparatus connected to the control server 7, the present disclosure can be configured in an aspect of a program executed by a processor of the computer for realizing the method, a recording medium that computer-readably records the program by the processor of the computer, or a transmission medium that transmits the program.

The function of the server control unit 70 may be realized in a form of a storage medium that stores the control program 71A, a server apparatus that delivers the control program 71A, a transmission medium that transmits the control program 71A, a data signal in which the control program 71A is embodied within carrier wave, or the like. As the storage medium, various media readable by the processor of the computer may be used, and any of magnetic, optical storage media or media using semiconductor memory devices or other types of storage media may be used. Or, a portable storage medium such as a memory card may be used. Or, the storage medium may be a storage medium provided in an apparatus connected to the above described apparatus via a communication line. The control program 71A may be mounted as a single application program that operates on an operating system in an apparatus that operates with the operating system mounted thereon. Or, the program may be mounted not only as the single application program but also as a plurality of functions of an operating system, a device driver, and an application program.

For example, the units of processing in FIGS. 3, 9, and 11 are divided according to the main processing details for ease of understanding of the processing by the POS terminal 4, the printer 3, the control server 7, and the management apparatus 5, and the present disclosure is not limited by the way of division and the names of the units of processing. The processing may be divided into more units of processing according to the processing details. Or, the processing may be divided so that the single unit of processing may contain more processing. The sequence of the processing may be exchanged as appropriate in a manner which does not interfere with the processing.

The respective functional units in FIG. 2 show the functional configurations and the specific mounting configurations are not particularly limited. That is, hardware individually corresponding to the respective functional units are not necessarily mounted, but, obviously, a configuration that realizes the functions of the plurality of functional units by execution of the programs using a single processor can be employed. Part of the functions realized by software in the above described embodiments may be realized by hardware or part of the functions realized by hardware may be realized by software. In addition, the specific detailed configurations of the other respective parts of the POS terminal 4, the printer 3, the management apparatus 5, and the control server 7 can arbitrarily be changed without departing from the scope of the present disclosure.

What is claimed is:

1. An information processing apparatus to which a control apparatus and a printer configured to print settlement information and issue a receipt are connectable, comprising a processor configured to acquire text data of the settlement information from the printer, transmit an HTML, file to the control apparatus, the HTML, file causing a user interface to be displayed at the control apparatus, wherein the user interface comprises at least one of the following fields associated with notation form(s): (1) a currency symbol field, (2) a decimal separator field, or (3) a grouping separator field, and each of the field(s) is configured to receive a user input of a setting related to a notation form of item values, receive the user input of the setting related to the notation form of item value from the control apparatus via the user interface, based on the received setting, acquire an item value of an item contained in the settlement information from the text data.

2. The information processing apparatus according to claim 1, wherein the setting relating to the notation form is a setting of a symbol of at least one of a currency, a decimal separator, and a grouping separator for notation of the item value indicating an amount of money.

3. The information processing apparatus according to claim 2, wherein the symbol of the decimal separator includes a symbol of at least one of a dot, a comma, an apostrophe, and a bullet point.

4. The information processing apparatus according to claim 2, wherein the symbol of the grouping separator includes a symbol of at least one of a dot, a comma, an apostrophe, and a space.

5. The information processing apparatus according to claim 1, wherein the setting relating to the notation form is a setting relating to a notation form of the item value indicating a date when the printer issues the receipt.

6. A control method for an information processing apparatus connectable to a printer configured to print settlement information and issues a receipt, comprising:

acquiring text data on the settlement information from the printer, transmitting an HTML, file to the control apparatus, the HTML, file causing a user interface to be displayed at the control apparatus, wherein the user interface comprises at least one of the following fields associated with notation form(s): (1) a currency symbol field, (2) a decimal separator field, or (3) a grouping separator field, and each of the field, and each of the field(s) is configured to receive a user input of a setting related to a notation form of item values, receiving the user input of the setting related to the notation form of item value from the control apparatus via the user interface, and acquiring an item value of an item contained in the settlement information from the text data based on the received setting.

7. The control method for the information processing apparatus according to claim 6, wherein the setting relating to the notation form is a setting of a symbol of at least one of a currency, a decimal separator, and a grouping separator for notation of the item value indicating an amount of money.

8. The control method for the information processing apparatus according to claim 7, wherein the symbol of the decimal separator includes a symbol of at least one of a dot, a comma, an apostrophe, and a bullet point.

9. The control method for the information processing apparatus according to claim 7, wherein
the symbol of the grouping separator includes a symbol of at least one of a dot, a comma, an apostrophe, and a space.

10. The control method for the information processing apparatus according to claim 6, wherein
the setting relating to the notation form is a setting relating to a notation form of the item value indicating a date when the printer issues the receipt.

11. A non-transitory storage medium storing a program for an information processing apparatus executable by a processor of the information processing apparatus communicable with a printer configured to print settlement information and issues a receipt, the processor
acquiring text data on the settlement information,
transmitting an HTML, file to a control apparatus, the HTML, file causing a user interface to be displayed at the control apparatus, wherein the user interface comprises at least one of the following fields associated with notation form(s): (1) a currency symbol field, (2) a decimal separator field, or (3) a grouping separator field, and each of the field, and each of the field(s) is configured to receive a user input of a setting related to a notation form of item values,
receiving the user input of the setting related to the notation form of item value from the control apparatus via the user interface, and
acquiring an item value of an item contained in the settlement information from the text data based on the received setting.

12. The non-transitory storage medium storing the program for the information processing apparatus according to claim 11, wherein
the setting relating to the notation form is a setting of a symbol of at least one of a currency, a decimal separator, and a grouping separator for notation of the item value indicating an amount of money.

13. The non-transitory storage medium storing the program for the information processing apparatus according to claim 12, wherein
the symbol of the decimal separator includes a symbol of at least one of a dot, a comma, an apostrophe, and a bullet point.

14. The non-transitory storage medium storing the program for the information processing apparatus according to claim 12, wherein
the symbol of the grouping separator includes a symbol of at least one of a dot, a comma, an apostrophe, and a space.

15. The non-transitory storage medium storing the program for the information processing apparatus according to claim 11, wherein
the setting relating to the notation form is a setting relating to a notation form of the item value indicating a date when the printer issues the receipt.

* * * * *